US009529614B2

(12) United States Patent
Lin et al.

(10) Patent No.: US 9,529,614 B2
(45) Date of Patent: Dec. 27, 2016

(54) AUTOMATICALLY BRIDGING THE SEMANTIC GAP IN MACHINE INTROSPECTION

(71) Applicant: The Board of Regents, The University of Texas System, Austin, TX (US)

(72) Inventors: Zhiqiang Lin, Dallas, TX (US); Yangchun Fu, Dallas, TX (US)

(73) Assignee: Board of Regents The University of Texas Systems, Austin, TX (US)

( * ) Notice: Subject to any disclaimer, the term of this patent is extended or adjusted under 35 U.S.C. 154(b) by 0 days.

(21) Appl. No.: 14/382,259

(22) PCT Filed: Mar. 5, 2013

(86) PCT No.: PCT/US2013/029021
§ 371 (c)(1),
(2) Date: Aug. 29, 2014

(87) PCT Pub. No.: WO2013/134206
PCT Pub. Date: Sep. 12, 2013

(65) Prior Publication Data
US 2015/0033227 A1      Jan. 29, 2015

Related U.S. Application Data

(60) Provisional application No. 61/606,849, filed on Mar. 5, 2012.

(51) Int. Cl.
G06F 9/455        (2006.01)
G06F 21/55        (2013.01)
(Continued)

(52) U.S. Cl.
CPC ......... *G06F 9/45533* (2013.01); *G06F 9/3004* (2013.01); *G06F 9/45558* (2013.01);
(Continued)

(58) Field of Classification Search
CPC ............ G06F 2009/45595; G06F 2009/45583; G06F 9/45533; G06F 9/45558; G06F 9/3004; G06F 21/55; G06F 11/3466; G06F 2201/815; G06F 2009/45587
See application file for complete search history.

(56) References Cited

U.S. PATENT DOCUMENTS 7,380,039 B2 *   5/2008   Miloushev ............ G06F 9/5016
                                                710/244
7,984,304 B1     7/2011   Waldspurger
                          (Continued)

FOREIGN PATENT DOCUMENTS

WO         2013134206        9/2013

OTHER PUBLICATIONS

B. Dolan-Gavitt, T. Leek, M. Zhivich, J. Giffin, and W. Lee. Virtuoso: Narrowing the semantic gap in virtual machine introspection. In IEEE Symposium on Security and Privacy, 2011.
(Continued)

Primary Examiner — Lewis A Bullock, Jr.
Assistant Examiner — Jacob Dascomb
(74) Attorney, Agent, or Firm — Thomas | Horstemeyer, LLP

(57) ABSTRACT

Disclosed are various embodiments that facilitate automatically bridging the semantic gap in machine introspection. It may be determined that a program executed by a first virtual machine is requested to introspect a second virtual machine. A system call execution context of the program may be determined in response to determining that the program is requested to introspect the second virtual machine. Redirectable data in a memory of the second virtual machine may be identified based at least in part on the system call execution context of the program. The program may be
(Continued)

configured to access the redirectable data. In various embodiments, the program may be able to modify the redirectable data, thereby facilitating configuration, reconfiguration, and recovery operations to be performed on the second virtual machine from within the first virtual machine.

20 Claims, 13 Drawing Sheets

(51) Int. Cl.
G06F 9/30 (2006.01)
G06F 11/34 (2006.01)

(52) U.S. Cl.
CPC .......... *G06F 21/55* (2013.01); *G06F 11/3466* (2013.01); *G06F 2009/45587* (2013.01); *G06F 2201/815* (2013.01)

(56) References Cited

U.S. PATENT DOCUMENTS

| | | | |
|---|---|---|---|
| 8,195,980 B2 | 6/2012 | Schuba et al. | |
| 8,261,029 B1* | 9/2012 | Marshak | G06F 3/0613 370/444 |
| 8,356,285 B2* | 1/2013 | Schuba | G06F 9/45558 717/127 |
| 2004/0078547 A1* | 4/2004 | David | G06F 9/4843 712/1 |
| 2007/0168565 A1* | 7/2007 | Yuhara | G06F 12/0871 710/1 |
| 2008/0320594 A1 | 12/2008 | Jiang | |
| 2009/0089879 A1 | 4/2009 | Wang | |
| 2009/0254724 A1* | 10/2009 | Vertes | G06F 9/526 711/162 |
| 2010/0251004 A1 | 9/2010 | Schuba | |
| 2011/0167422 A1* | 7/2011 | Eom | G06F 9/45558 718/1 |
| 2011/0265076 A1* | 10/2011 | Thorat | G06F 8/65 717/172 |
| 2012/0054744 A1* | 3/2012 | Singh | G06F 21/53 718/1 |
| 2012/0233614 A1* | 9/2012 | Adler | G06F 11/3676 718/100 |
| 2013/0029021 A1 | 1/2013 | Ketter, Jr. et al. | |
| 2013/0091568 A1* | 4/2013 | Sharif | G06F 21/50 726/22 |

OTHER PUBLICATIONS

X. Jiang, X. Wang, and D. Xu. Stealthy malware detection through vmm-based out-of-the-box Semantic view reconstruction. In 14th ACM CCS, 2007.

B. D. Payne, M. Carbone, and W. Lee. Secure and flexible monitoring of virtual machines. In 23rd ACSAC, 2007.

B. D. Payne, M. Carbone, M. I. Sharif, and W Lee. Lares: An architecture for secure active monitoring using virtualization. In IEEE Symposium on Security and Privacy, 2008.

B. Hay and K. Nance. Forensics examination of volatile system data using virtual introspection. SIGOPS Operating System Review, 2008.

P. M. Chen and B. D. Noble. When virtual is better than real. In 8th HotOS, 2001.

M. Rosenblum and T. Garfinkel. Virtual machine monitors: Current technology and future trends. IEEE Computer, 2005.

T. Garfinkel and M. Rosenblum. A virtual machine introspection based architecture for intrusion detection. In 10th NDSS, 2003.

International Search Report and Written Opinion, mailed May 22, 2013.

* cited by examiner

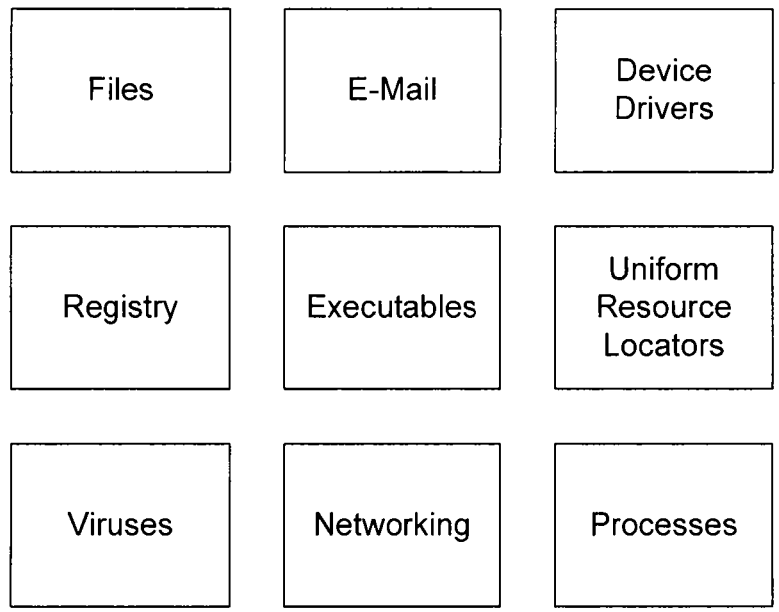

FIG. 3

```
 1  execve("./getpid", ["./getpid"], [/* 38 vars */]) = 0
 2  brk(0)                                  = 0x83b8000
 3  access("/etc/ld.so.nohwcap", F_OK)      = -1 ENOENT
 4  mmap2(NULL, 8192, PROT_READ|PROT_WRITE, ..., -1, 0) = 0x4001d000
 5  access("/etc/ld.so.preload", R_OK)      = -1 ENOENT
 6  open("/etc/ld.so.cache", O_RDONLY)      = 3
 7  fstat64(3, {st_mode=S_IFREG|0644, st_size=50205, ...}) = 0
 8  mmap2(NULL, 50205, PROT_READ, MAP_PRIVATE, 3, 0) = 0x4001f000
 9  close(3)                                = 0
10  access("/etc/ld.so.nohwcap", F_OK)      = -1 ENOENT
11  open("/lib/tls/i686/cmov/libc.so.6", O_RDONLY) = 3
12  read(3, "\177ELF\1\1\1\0\0\0\0\0\0\0\0\0\3\0\3\0\340g\1"..., 512) = 512
13  fstat64(3, {st_mode=S_IFREG|0755, st_size=1425800, ...}) = 0
14  mmap2(NULL, 1431152, PROT_READ|PROT_EXEC, ..., 0) = 0x4002c000
15  mmap2(0x40184000, 12288, PROT_READ|PROT_WRITE, ..., 0x158) = 0x40184000
16  mmap2(0x40187000, 9840, PROT_READ|PROT_WRITE, ..., -1, 0) = 0x40187000
17  close(3)                                = 0
18  mmap2(NULL, 4096, PROT_READ|PROT_WRITE, ..., -1, 0) = 0x4018a000
19  set_thread_area({entry_number:-1 -> 6,...}) = 0
20  mprotect(0x40184000, 8192, PROT_READ)   = 0
21  mprotect(0x4001b000, 4096, PROT_READ)   = 0
22  munmap(0x4001f000, 50205)               = 0
23  getpid()                                = 13849
24  fstat64(1, {st_mode=S_IFCHR|0620, st_rdev=makedev(136, 1), ...}) = 0
25  mmap2(NULL, 4096, PROT_READ|PROT_WRITE, ..., -1, 0) = 0x4001f000
26  write(1, "pid=13849\n", 10)             = 10
27  exit_group(0)                           = ?
```

| Category | System Calls |
| --- | --- |
| State Query | get (p \| t \| u \| g \| eu \| eg \| pp \| pg \| resu \| resg)id, getrusage, getrlimit, sgetmask, capget, gettimeofday, getgroups, getpriority, getitimer, get_kernel_syms, getdents, getcwd, ugetrlimit, timer_gettime, timer_getoverrun, clock_gettime, clock_getres, get_mempolicy, getcpu |
| File System | open, fstat, stat, lstat, statfs, fstatfs, oldlstat, ustat, lseek, _llseek, read, readlink, readv, readdir |

FIG. 9

| Kernel Data Redirection Algorithm |
|---|

| |
|---|
| 1: Require: SysExecContext(s) returns true if syscall s is executed in a system call execution context; SysRedirect(s) returns true if data access in s needs to be redirected; RedirectableDataTracking(i) performs our redirectable data identification and flow tracking for instruction i; MemoryAddress(i) returns a set of memory addresses that need to be accessed by instruction i. NotDirty(a) queries STLB, or SCR3 and the page table to check if the physical page located by a is dirty. V2P(a) will translate the virtual address of a and get its physical address by querying STLB, or SCR3 and the page tables and updating STLB if necessary.<br>2:  DynamicInstInstrument(i):<br>3:     if SysExecContext(s):<br>4:         if SysRedirect(s):<br>5:             RedirectableDataTracking(i):<br>6:             for a in MemoryAddress(i):<br>7:                 if DataRead(a):<br>8:                     PA(a) <- V2P(a)<br>9:                     Load(PA(a))<br>10:              else:<br>11:                 if NotDirty(a):<br>12:                     CopyOnWritePage(a)<br>13:                     UpdatePageEntryInSTLB(a)<br>14:                 PA(a) <- V2P(a)<br>15:                 Store(PA(a)) |

FIG. 10

```
1 execve("/sbin/sysctl",["sysctl", "-w","kernel..=1"],...) = 0
2 brk(0)                                     = 0x604000
3 access("/etc/ld.so.nohwcap",F_OK)          = -1 ENOENT
4 mmap(NULL, 8192, PROT_READ|.., -1,0) = 0x7f07b1749000
5 access("/etc/ld.so.preload",R_OK)          = -1 ENOENT
6 open("/etc/ld.so.cache", O_RDONLY)         = 3
...
47 open("/proc/sys/kernel/randomize_va_space",O_WRONLY|...) = 3
48 fstat(3, {st_mode=S_IFREG|0644, st_size=0, ...}) = 0

49 mmap(NULL, 4096, PROT_READ|.., -1, 0) = 0x7f07b1748000
50 write(3, "1\n", 2)                        = 2
51 close(3)                                  = 0
...
57 exit_group(0)                             = ?
```

FIG. 12

```
<spin_lock> in 2.6.34
0xc0129950: 55                  push ebp
0xc0129951: ba 00 01 00 00      mov edx, 0x100
0xc0129956: 89 e5               mov ebp, esp
0xc0129958: 3e 66 0f c1 10      xadd word ptr ds[eax], dx
0xc012995d: 38 f2               cmp dl, dh
0xc012995f: 74 06               jz 0xc0129967
0xc0129961: f3 90               pause
0xc0129963: 8a 10               mov dl, byte ptr ds[eax]
0xc0129965: eb f6               jmp 0xc012995d
0xc0129967: 5d                  pop ebp
0xc0129968: c3                  ret <spin_lock> in 3.0.4
0xc1026a70: 55                  push ebp
0xc1026a71: ba 00 01 00 00      mov edx, 0x100
0xc1026a76: 89 e5               mov ebp, esp
0xc1026a78: 3e 66 0f c1 10      xadd word ptr ds[eax], dx
0xc1026a7d: 38 f2               cmp dl, dh
0xc1026a7f: 74 06               jz 0xc1026a87
0xc1026a81: f3 90               pause
0xc1026a83: 8a 10               mov dl, byte ptr ds[eax]
0xc1026a85: eb f6               jmp 0xc1026a7d
0xc1026a87: 5d                  pop ebp
0xc1026a88: c3                  ret
```

FIG. 13

AUTOMATICALLY BRIDGING THE SEMANTIC GAP IN MACHINE INTROSPECTION

CROSS-REFERENCE TO RELATED APPLICATION

This application is the 35 U.S.C. §371 national stage of, and claims priority to and the benefit of, PCT application PCT/US2013/029021, filed Mar. 5, 2013, which claims priority to and the benefit of U.S. Provisional Application No. 61/606,849, filed on Mar. 5, 2012, herein incorporated by reference in its entirety.

STATEMENT REGARDING FEDERALLY SPONSORED RESEARCH OR DEVELOPMENT

This invention was made with government support under grant FA9550-12-1-0077 awarded by the U.S. Air Force Office of Scientific Research. The government has certain rights in the invention.

BACKGROUND

A virtual machine (VM) is a software implementation of a computing environment that can execute its own operating systems and programs as if it were a physical computer. Virtual machines are created within a virtualization layer that can be used to create many individual virtual machine environments. While virtual machines can share the physical resources of a single computer, they can remain completely isolated from each other as if they were separate physical machines. Consequently, if, for example, a virtual machine in a physical server crashes or is compromised, the other virtual machines on that physical server remain available. Isolation is one reason why the availability and security of applications running in a virtual environment can be superior to applications running in a traditional, non-virtualized system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 illustrates example raw data (bits and bytes) that is often obtained in machine introspection according to an illustrative embodiment;

FIG. 3 illustrates examples of high level semantic information that is desired in machine introspection according to an illustrative embodiment;

FIG. 4 illustrates an example utility program for inspecting an operating system state according to an illustrative embodiment;

FIG. 8 is an example of shadow memory state and taint propagation of machine introspection system code according to an illustrative embodiment;

FIG. 9 is a table illustrating an example introspected system call according to an illustrative embodiment;

FIG. 10 illustrates example program code for redirecting kernel data according to an illustrative embodiment;

FIG. 12 illustrates an exemplary system call trace for a program according to an illustrative embodiment.

FIG. 13 illustrates an exemplary disassembled instruction sequence for a synchronization primitive in different operating system kernels according to an illustrative embodiment;

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense.

I. INTRODUCTION

Figure 1:
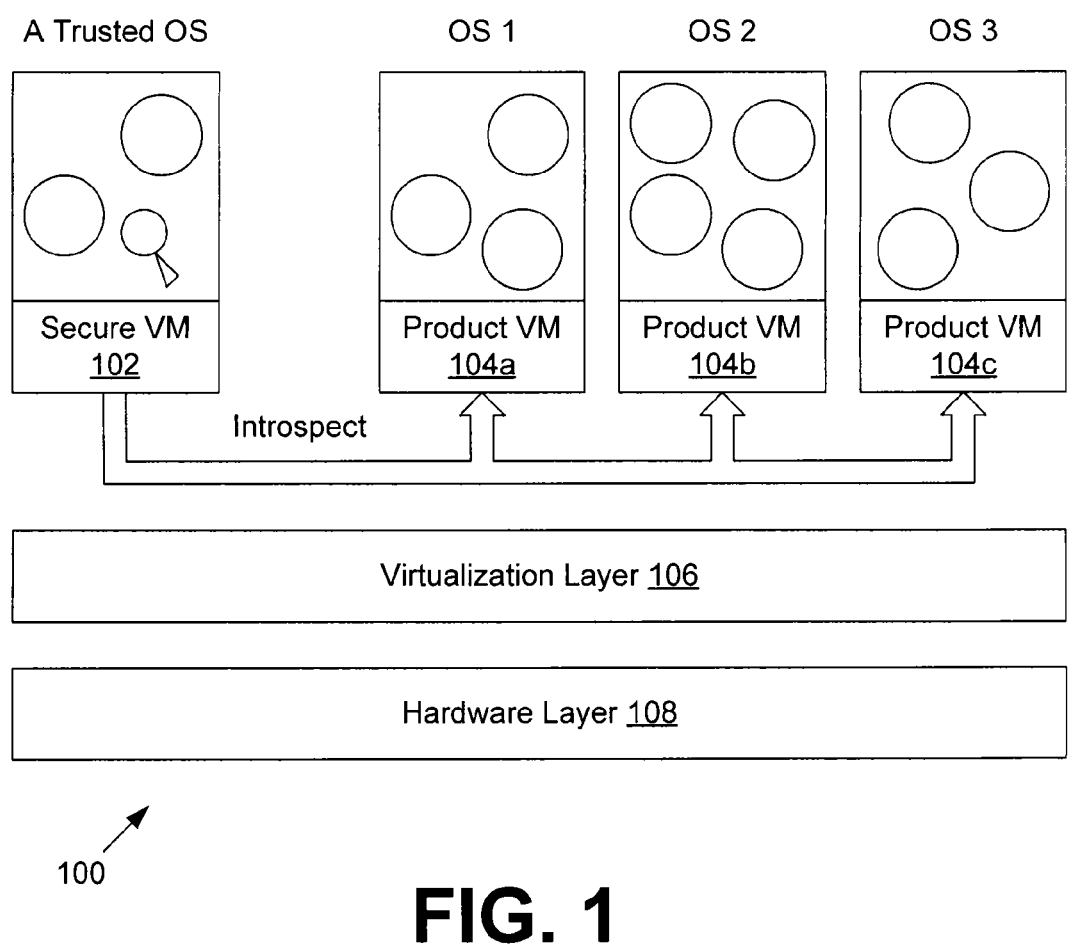
FIG. 1 is a schematic, pictorial representation of a machine introspection system according to an illustrative embodiment.

FIG. 1 is a schematic, pictorial representation of a machine introspection system 100 according to an illustrative embodiment. In cloud computing, secure virtual machines (secure-VMs 102) may be used to supervise, or introspect, the activity of the other virtual machines (prod-uct-VMs 104a, 104b, 104c) as shown in the machine introspection system 100 in FIG. 1. The machine introspection system 100 further comprises a virtualization layer 106 and a hardware layer 108. Introspection offers an isolated and secure method of supervising the activity of virtual machines. For example, the secured and monitoring virtual machine 102 may not be connected to the Internet, and as such it is very difficult for hackers to compromise this machine. When the secured, monitoring virtual machine 102 performs introspection of another virtual machine 104, however, it is often necessary for the secured, monitoring virtual machine 102 to interpret the hardware-level state of the inspected, untrusted virtual machine 104. These hardware-level states may comprise low-level bits and bytes from the physical memory of the inspected virtual machine.

Figure 2:
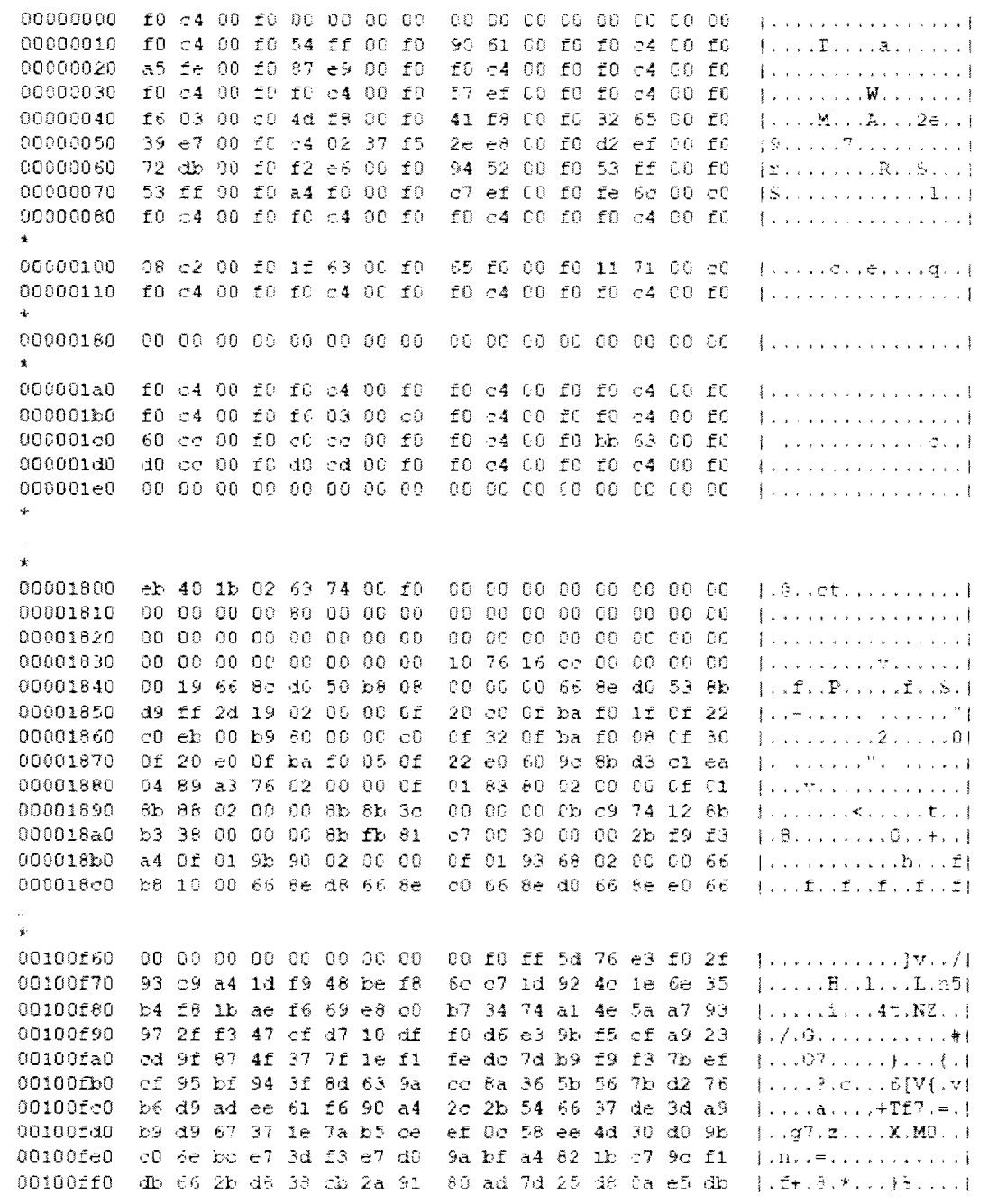

FIG. 2 illustrates an example of raw data (bits and bytes) that may be obtained in machine introspection. FIG. 3 illustrates examples of high level semantic information that is desired in machine introspection by the monitoring virtual machine. Such examples may include files, email, device drivers, registry information, executable information, uniform resource locators (URLs), viruses, networking information, executing processes, among others. The difficulty in interpreting the low level bits and bytes as represented in FIG. 2 into the high level semantic state that the secured, monitoring virtual machine 102 can understand as represented in FIG. 3 is commonly referred to as the semantic gap.

Virtual machine introspection (VMI) may pull the in-guest (inspected VM) operating system (OS) state to the outside virtual machine monitor (VMM), thereby offering an additional layer of isolation and opening new opportunities for security, reliability, and administration. VMI may be employed for intrusion detection, malware analysis, process monitoring, network firewalls, and memory forensics, among other applications. However, when performing the introspection, the in-guest hardware-level state, such as processors, physical memory and devices, may be interpreted at the outside VMM layer in order to obtain the high level semantic information. The introspection routine may reconstruct the high level information by interpreting the low level data. Such interpretation may involve building an introspection routine that has a detailed, up-to-date knowledge of the internal OS kernel structures running in the inspected virtual machine. For example, to introspect the process ID (pid) of a running process in a Linux kernel, one has to traverse the corresponding task_struct to fetch its pid field. Acquiring such knowledge can be tedious and time-consuming, even for an OS whose source code is available. For a closed source OS, one may have to manually reverse engineer the internal kernel workings and determine how to introspect, which may be error-prone.

As previously mentioned, the semantic gap refers to the difficulty in interpreting the low level bits and bytes from the virtual machine being monitored into a high level semantic state that the secured, monitoring virtual machine can understand. It is generally believed to be a tedious, time-consuming, and error-prone process to develop a virtual machine introspection tool manually because of the semantic gap. One technique to bridge the semantic gap may involve the Linux crash dump analysis tool. However, this technique employs a kernel that is specially recompiled with the debugging symbols.

Another technique to bridge the semantic gap involves locating known structures of the in-guest memory, traversing and interpreting them. However, this technique relies on a manual effort to locate the in-guest kernel data structures (by following the exported symbol table or searching some magic numbers) and develop the in-guest equivalent kernel code to traverse and inspect. In addition, such a manual process has to be repeated for different kernels, which may suffer from frequent changes due to the new releases or patches. Furthermore, it may also introduce opportunities for attackers to evade these hand-built introspection tools if they are not carefully written.

Another approach may involve automatically generating introspection programs by reusing the code logics of an in-guest trusted OS kernel, and allowing an expert to create introspection programs from the traces of the in-guest programs. More specifically, given an introspection functionality (e.g., list all processes), such an approach may train and trace the system wide execution of the in-guest programs (e.g., ps) by an expert, automatically identify the instructions necessary in accomplishing this functionality, and finally generate the corresponding introspection code that reproduces the same behavior of the in-guest programs. However, due to the nature of dynamic analysis, such an approach is limited to reproducing introspection code that has been executed and trained. Thus, these approaches fail to provide a mechanism for bridging the semantic gap in machine introspection that is automatic and transparent to end users, native developers, and the operating system.

The illustrative embodiments provide an Introspection System that automatically bridges the semantic gap in machine introspection and automatically generates a large volume of machine introspection tools. Through system wide instruction monitoring, the Introspection System can automatically identify the introspection related data and redirect these data accesses to the in-guest kernel memory, which could be mapped on-line or from a snapshot. Two insights may be employed by the Introspection System. The first insight is that introspection code already exists in the trusted version of the in-guest OS. Therefore, instead of extracting this code from execution traces, the Introspection System may retain the OS kernel code and wrap it into a virtual machine monitor. The second insight is that machine introspection may perform read (i.e., inspect) operations of the in-guest memory. Thus, the Introspection System may redirect the memory read of these kernel instructions, which are responsible for the introspection, including when the instructions can be automatically identified.

In various embodiments, the Introspection System does not simply redirect all kernel memory access, because kernel code may be redirected as well (in-guest kernel code is untrusted and can be tampered by attackers). Meanwhile, it may be that not all kernel data access can be redirected. For example, an interrupt handler expects to read some hardware states, but after the redirection, the interrupt handler may receive an inconsistent state leading to kernel panics. Also, data in the kernel stack cannot be redirected; otherwise kernel control flow will be disrupted. As such, the Introspection System may need to identify where the redirectable data is and only redirect the introspection related data. To this end, a number of OS-agnostic (or OS-independent) enabling techniques may be provided by the Introspection System, including system call execution context identification, introspection data identification, and kernel data redirection at the VMM layer.

The Introspection System also keeps transparency to the guest OS in mind (being OS-agnostic as much as possible), and the system may achieve nearly full transparency against an in-guest OS kernel. For example, without any modification, the Introspection System may directly support a number of the most recent released Linux kernels. When using the Introspection System, for a particular OS, end users may only need to install the corresponding trusted version of the guest OS in the virtual machine provided with the Introspection System, and attach or mount the in-guest memory. The in-guest memory may be a live memory for virtual machine introspection or an off-line snapshot for memory forensics. Subsequently, end users may use a variety of OS utilities (e.g., ps, lsmod) to inspect the state of the in-guest OS.

The Introspection System in the illustrative embodiments provides several features and capabilities, usable in any combination. For example, the Introspection System enables the automatic creation of secure introspection tools. Such security is achieved by the nature of virtual machine introspection and the technique of the automatic tool generation. The VMI-tools provided by the Introspection System are generated from trusted OS code and the widely used and tested utilities without any modification; hence, these introspection tools may be more secure than many other manually created ones. In addition, the VMI-tools provided by the Introspection System may also be more reliable than tools generated through approaches that cannot guarantee the path coverage in their training; yet the Introspection System in the illustrative embodiments may retain all the code. Furthermore, the Introspection System may directly generate a large volume of introspection without having to train each program one by one to get the new VMI tools. Also, the Introspection System may allow the user-level programmers to develop new user-level programs natively to monitor system status (by invoking native system calls) for the introspection. Moreover, the Introspection System also allows the kernel-level programmers to develop native device drivers for inspecting the kernel states for the introspection. In short, the Introspection System disclosed in the illustrative embodiments automatically enables an in-guest legacy inspection program to become an introspection program, without requiring any involvement from end-users and developers.

The Introspection System disclosed in the illustrative embodiments may also introduce a new binary code reuse technique. Unlike existing techniques which extract the code outside, the Introspection System may retain the code in original form but dynamically instrument the code to achieve the desired goals. This code reuse technique is truly feasible in the VMI domain and demonstrates that end-users can automatically obtain a variety of VMI tools without any knowledge of the OS kernel internals. A set of novel OS-agnostic enabling techniques, including system call execution context identification, automatic introspection data tracking, and kernel data redirection, may be included in the Introspection System which achieves full or almost full transparency of these techniques against an OS kernel.

Although the embodiments of the Introspection System described herein mainly focus on introspection techniques performed in virtual machine environments, it should be noted that the illustrative embodiments are also equally applicable to implementation in physical machine, or other machine, environments and providing techniques to bridge the semantic gap in physical machine introspection.

II. SYSTEM OVERVIEW

A. Observations and Challenges

The Introspection System in the illustrative embodiments functions to bridge the semantic-gap and enable automated VMI tool generation. A basic observation is made that many introspection tools are mainly used to query the OS state, e.g., listing all the running processes, opened files, installed drivers, and connected sockets. These logics may be shipped in an OS kernel with the corresponding user level utilities. Thus, instead of building the introspection tools from scratch, the Introspection System may almost fully reuse the user level as well as OS kernel code to automatically implement them.

More formally, as a program $P(x)$ is often composed of code P and data x. For the same program, P is usually identical across different machines, and the only difference is the run-time consumed data x. In normal scenario, for a machine A, its P always consumes the x in A. Thus, the Introspection System functions to make P (an inspection program such as an anti-virus software) in machine A transparently consume the data y in machine B (i.e., without the awareness that y comes from B), thereby automatically generating an introspection program P' such that $P'(x)=P(y)$.

FIG. 4 illustrates an example utility program for inspecting an OS state according to an illustrative embodiment. In particular, FIG. 4 shows system level behavior (in terms of system call trace) of a typical user level getpid program. Consider the following example to assist in understanding the basic observation made above.

Without introspection, normally when a utility program is run to inspect an OS state (e.g., get a current process ID (getpid) from a Linux kernel), first the OS kernel may, as shown in FIG. 4, create a new process (execve), set the end of the data segment (brk), check (access) any libraries compiled for different hardware capabilities (HWCAP, Id.so.nohwcap), check any library for pre-loaded (Id.so.preload), open the /etc/Id.so.cache which contains a compiled list of candidate libraries, map them to the memory, map the standard shared library (open, fstat, map, map2), execute the getpid system call, output the result (write), and exit the process (exit group).

With introspection, in order to fully reuse the OS as well as user level program code, the data read which is only related to the desired introspection functionality should be redirected. In the getpid example, the data redirect should be within the getpid system call. For data in user space and other irrelevant kernel space, there may be no redirection and both kernel and other user processes may be kept running correctly.

Thus, the Introspection System in the illustrative embodiments may function to (1) automatically identify the introspection execution context, (2) automatically identify the data which is related to the introspection, (3) automatically redirect the data access in kernel code which is responsible for the introspection, and (4) keep all the processes running, at the VMM layer. Providing a solution to these problems can be a challenge since as the OS kernel may be designed to manage computer hardware resources (e.g., memory, disk, I/O, network) and provide common services (i.e., system calls) for application software, it has a very complicated control flow and data access. In particular, the kernel typically may contain many resource (e.g., page tables, slab objects, device drivers) management routines, interrupt and exception handling routines (e.g., tinier, keyboard, page fault handler), context switch routines, and system call service routines. As such, when serving a system call, an interrupt, a page fault (an exception), or a context switch could occur. It may be adverse to redirect the kernel data access in context switches, page fault handlers, or interrupt service routines, or redirect the data access in the execution context of any other processes.

Data access may include code reads or data reads. One of the advantages of virtual machine introspection is that attackers usually cannot modify the introspection code. Thus, the Introspection System may not want to load any code from an untrusted guest, and the system may have to differentiate kernel code and data. Also, data may be in kernel global variable regions, heap regions, or stack regions. It may be adverse to redirect the kernel stack read, as such action may lead to a kernel crash (because of control data such as return addresses in the stack). Moreover, when redirecting the data, the Introspection System in the illustrative embodiments may need to perform the virtual to physical address translation. Otherwise the system may not be able to find the correct in-guest memory data. Further, the Introspection System in the illustrative embodiments may need to perform a copy on write (COW) of the redirected data to ensure there is no side effect of the in-guest memory. The Introspection System in the illustrative embodiments may employ the corresponding techniques to solve these issues.

B. Scope and Assumptions

An example design aspect of the Introspection System in the illustrative embodiments is that it is transparent (OS-agnostic) to a variety of OS kernels. The Introspection System may rely on some OS knowledge. For example, the Introspection System may need to understand what kind of system calls are related to the introspection. In this disclosure, focus is primarily on the Linux/UNIX OS, on top of the widely used x86 architecture; however, it should be noted that the aspects of the illustrative embodiments are equally applicable to other systems and other architectures, such as, for example, Microsoft® Windows® and SPARC.

For transparency, when designing the Introspection System, it may be advantageous to avoid hard coding of any specific kernel addresses. Otherwise, the coding may be too specific to a particular kernel (OS-gnostic), and instead it may be preferred to use the knowledge from the general Linux/UNIX design principles. In addition, it is assumed that the secured VMM can intercept the system-wide instructions, because the Introspection System dynamically instruments the instructions and redirects the data access if instructions are introspection related.

It is also assumed that end-users may have a trusted in-guest OS copy. The trusted copy of an OS kernel may be installed in the Introspection System, and executed along with the utilities to provide the introspection. One reason why it may be desirable to have a corresponding trusted copy of the in-guest OS is that without the copy, when the Introspection System redirects the introspection data, it may lead to a wrong in-guest memory address.

C. Architecture

Figure 5:
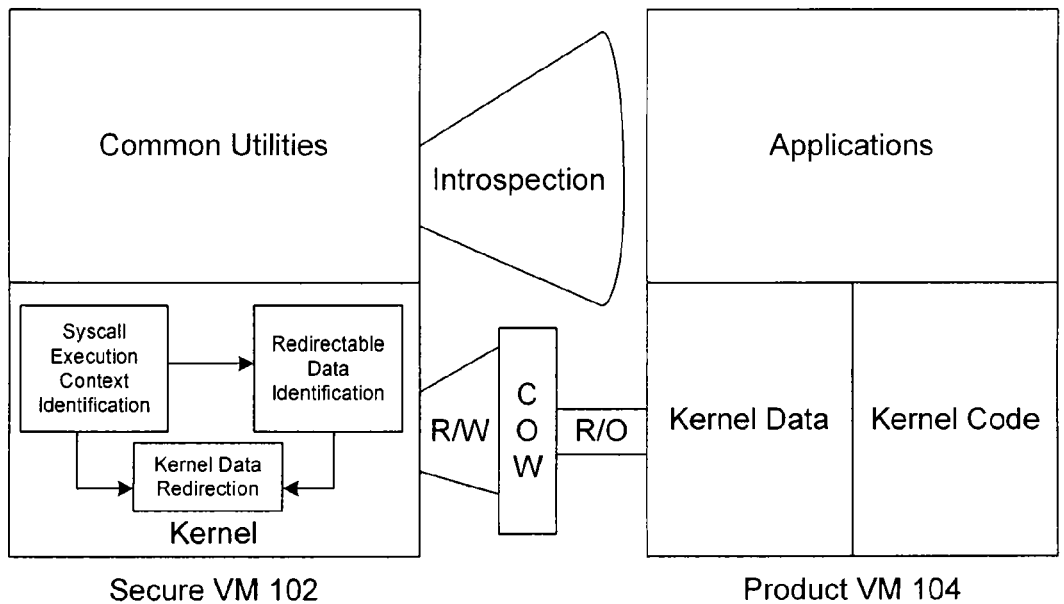
FIG. 5 is a schematic, pictorial representation of an exemplary overview architecture of the machine introspection system according to an illustrative embodiment.

FIG. 5 provides an architectural overview of the Introspection System according to an illustrative embodiment. For any untrusted OS running on top of the product VM 104, suppose an end-user wants to perform the introspection. The end-user may only need to install the corresponding trusted version of the in-guest OS on top of the secure VM 102 (shipped in the Introspection system) and invoke the commonly used standard utility programs without any modification. Thus, the end-user may not have to perform any manual effort to understand (or reverse engineer) the OS kernel and write the introspection program. Meanwhile, if the end-user wants to customize an introspection program, the end-user may develop these programs natively (e.g., invoking native APIs/system calls) without concern for any OS kernel internal workings. Note that the product VM 104 and the secure VM 102 in FIG. 5 can be entirely different, and the Introspection System in the illustrative embodiments may be bounded with its own virtual machine monitor, the secure VM 102 and may be transparent to the guest virtual machine monitor, the product VM 104 which can be a virtual machine running on top of XEN®/KVM/VMWare®/VirtualBoxNirtualPC/QEMU, or even be a physical machine as long as its memory is accessible.

The following example may assist in understanding the techniques of the Introspection System. Again, software is composed of code and data, and the data may be consumed by software as the data travels from machine A to machine B. Machine B may then read the data from machine A in a normal way, and this may be achieved by the processes in the Introspection System. For instance, consider anti-virus software as an example. Users who need to scan for computer viruses may buy anti-virus software from a company, and this is the software code. The anti-virus software is installed in computer A, and reads the data in computer A. This is the normal case. The Introspection System allows for transparently replacing the original data for the anti-virus software in machine A, with the data from machine B. To the anti-virus software, everything is normal, and this software does not know the data it consumes has been replaced by the Introspection System techniques.

In one embodiment, the Introspection System may employ three main techniques: (1) system call execution context identification, (2) redirectable data identification, and (3) kernel data redirection. System call execution context identification may be used to identify only the system call execution context relevant to the introspection, and ensure the kernel data redirection only redirects the data in the context of interest. Redirectable data identification may pinpoint and track only the data which is redirected under the context identified by the system call execution context identification. Kernel data redirection may perform the final redirection at the instruction level. Copy-on-write (COW) may be performed if there is any data write on the redirected data.

III. SYSTEM CALL EXECUTION CONTEXT IDENTIFICATION

Because of the complicated kernel control flow, the Introspection System may first identify the exact system call execution context, in which the redirection for the necessary system call is performed. When an introspection program is running, there may be two address spaces: user space and kernel space. In the x86 architecture, each process (and kernel thread, which essentially is a process) may have a unique CR3 value for locating the page directory. The Introspection System may thus isolate the corresponding kernel space as well as user space for the introspection process by inspecting the CR3 value.

Then, the question is how to acquire the right CR3 value of the monitored process, given only the introspected process name. Note that the secure-VM 102 in the Introspection System is transparent to the in-guest OS, and the system should not traverse any specific task_struct to obtain the process name field, even though it could. This turns out to be a challenging task, but before describing the solution to the task, first consider what could be done at the VMM layer.

Consider identification of the system call entry point. In Linux, user level programs invoke int 0x80 or sysenter instructions to enter the kernel space. Therefore, by intercepting these two instructions at the VMM layer, it may be sufficient to identify the beginning of a system call execution context. However, consider identifying the exit point of a system call. A naive approach may directly intercept the sysexit or iret instruction to determine the exit point. However, this approach may not work because of interrupt and exception handling, as well as the possibility of a context switch happening during the execution of a system call.

Figure 6:
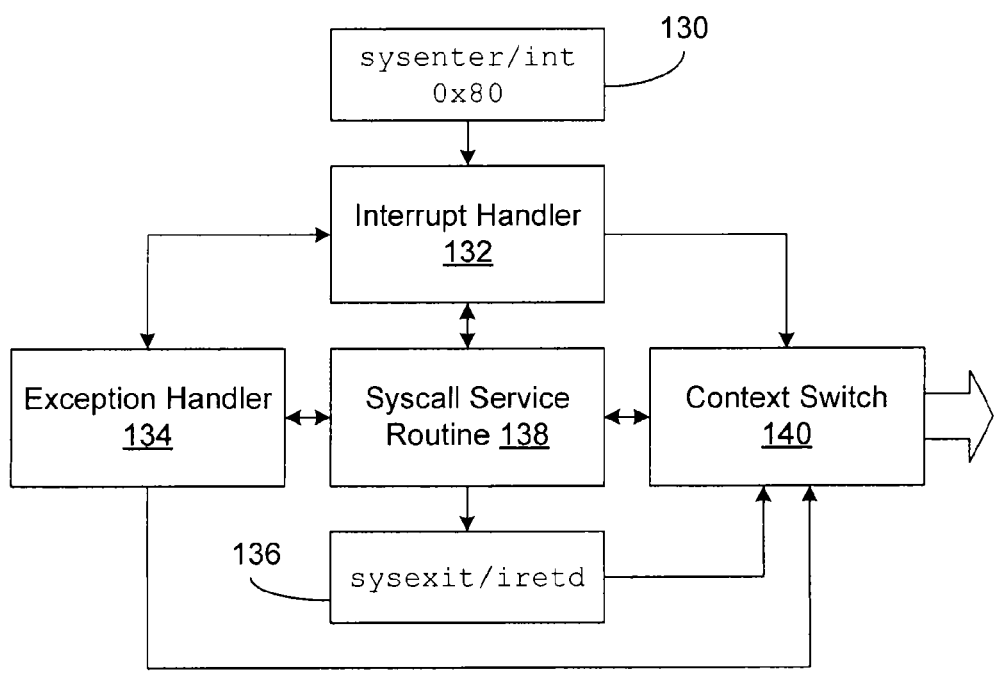
FIG. 6 is a schematic, pictorial representation of a typical kernel control flow when serving a system call according to an illustrative embodiment.

FIG. 6 illustrates a typical kernel control flow when serving a system call according to an illustrative embodiment. As shown in FIG. 6, at a high level, when serving a system call, an interrupt 130 may occur and kernel control flow may go to the interrupt handler 132. An exception such as a page fault (when a system call routine accesses some unmapped memory region of the process) may also occur and may be handled by an exception handler 134. Also, at the system call exit point 136 or during the service of a system call by a system call service routine 138, a context switch 140 may occur (e.g., a process has completed its time slice). A context switch 140 may also occur in the interrupt handler 132 and exception handler 134.

Fortunately, since the secure-VM 102 virtualizes all hardware resources (e.g., through emulation), these hardware resources may easily be observed and controlled, including the interrupt and timer at the VMM layer, as long as the introspection process and kernel are kept running correctly. More specifically, the following approaches may be used to handle interrupt, exception, and context switch in one embodiment of the Introspection System.

Interrupt and Exception Handling—Generally, there may be two kinds of interrupts: synchronous interrupts generated by the central processing unit (CPU) while executing instructions, and asynchronous interrupts generated by the other hardware devices at arbitrary times. In the x86 architecture, synchronous interrupts are designated as exceptions, and asynchronous interrupts as interrupts.

When an interrupt occurs (if interrupts are not disabled), whether it is an exception or a hardware interrupt the processor will first issue an interrupt vector number to the hardware interrupt controller. This controller will pick up the corresponding interrupt handler, to which the kernel control flow will transfer. By monitoring this controller and tracking the interrupt number, the Introspection System may differentiate system calls (int 0x80) and other interrupt or exception handlers, and the system can track the beginning of an interrupt service.

In one embodiment of the Introspection System, before the interrupt handler gets executed (but not before the system call is executed), a global flag may be set to indicate data in the current execution context is not redirectable (as the kernel control path will be in the interrupt context). Also, as an interrupt may or will end with an iret instruction, the Introspection System is able to track the end of an interrupt. However, the interrupt could be nested. That is, when serving an interrupt, the kernel could suspend the execution of the current interrupt in response to a higher priority interrupt.

Therefore, the Introspection System may use a stack data structure to track the execution status of the interrupt handler. In particular, a counter may be used to simulate the stack. Whenever an interrupt other than a system call happens, the counter may be increased; when an iret instruction executes, the counter may be decreased. If the counter becomes zero, it means the interrupt service has finished. Note that the counter may only be updated when the execution context is within the introspection process, and initially the counter is zero.

In another embodiment of the Introspection System, the next program counter (PC) in the system call routine may be tracked to determine the end of an interrupt, since after an interrupt handler finishes, it may transfer the kernel control flow back to the system call routine (the next PC). In one example of a Linux kernel, the system call routine may call the cond_reschedule function to determine whether a context switch is needed (in particular checking the _TIF_NEED_RESCHED flag in the kernel stack), and the system call routine may also be called in the interrupt and exception handler routine. If an interrupt occurs during the execution of cond_schedule in the system call context, this approach may mistakenly identify the end of an interrupt handler. Note that cond_reschedule execution does not disable the preemption, but another schedule function does.

The stack-based approach above is able to determine the interrupt handler context, or more specifically, the top half of an interrupt. However, one may be concerned with how to identify the bottom half of an interrupt as most UNIX systems, including Linux, divide the work of processing interrupts into two parts or halves. Fortunately, the execution of the bottom half of an interrupt is usually bounded with a working queue and will be scheduled by a context switch, which is discussed below.

Context Switch Controlling—Context switches provide techniques that allow multiple processes to share a single CPU. Basically, a context switch is a procedure of storing and restoring the context state (including CPU registers, CR3, etc.) of a process (or a kernel thread) such that execution can be resumed from the same point at a later time. A context switch could occur in a variety of cases in Linux/UNIX including:

(i) arbitrary places, when an interrupt happens (could be timer) and the process has used its CPU time slice (preempted);

(ii) when a process voluntarily relinquishes their time in the CPU (e.g., invoking sleep, waitpid or exit system call);

(iii) when a system call is about to return;

(iv) other system call subroutine places (besides system call return point), in which the kernel pro-actively checks whether a context switch is needed;

(v) in exception (e.g., page fault) handler; or (vi) when a system call gets blocked.

Figure 7:
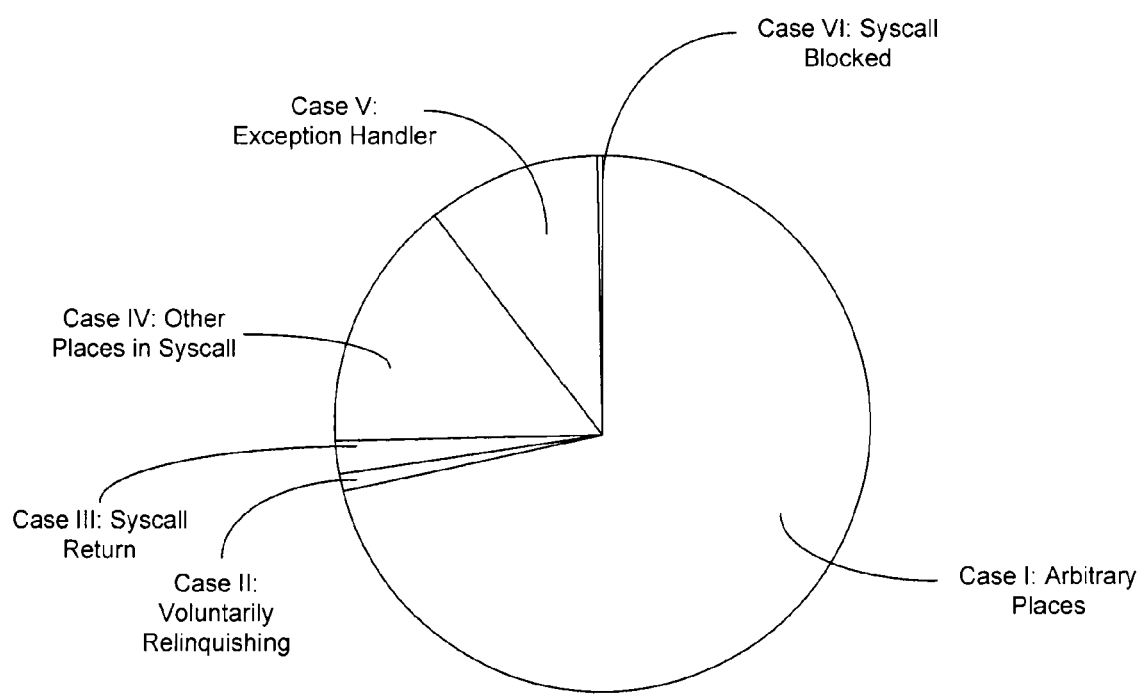
FIG. 7 is a chart illustrating statistics of context switch when running a program according to an illustrative embodiment.

In the design of the Introspection System, an execution of the ps command was profiled, and the statistics of where a context switch happens is reported in the chart shown in FIG. 7. Among these six cases, three (Case-I, Case-III, and Case-IV which account for 99.3% in the profile) are triggered due to the time slice. Case-II (0.7%) is not of concern because the entry of the sleep or waitpid system call can be detected and the redirection in these system calls execution context, including any other possible context switches, can be disabled. After context switching to other processes, the processor may switch back to these system calls execution context and the Introspection System may be able to detect it by just looking at the CR3. Also, an introspection program typically will not invoke the blocking-mode system calls (Case-VI). Meanwhile, Case-V can be detected by the exception hander discussed above.

Therefore, a view is that as long as the running introspection process is kept always owning the CPU, the context switch can be prevented from occurring until the monitored process exits, or the context switch may be allowed as long as the Introspection System can proactively detect it (such as the case of sleep system call). It turns out that such an approach may function by disabling the timer ticks during the introspection process context, because at the VMM layer the Introspection System may own the hardware and can modify the timer such that the process will not feel it has gone beyond its time slice.

Next, the manner in which the right CR3 may be acquired when only given a to-be-executed process name is described. Notice in FIG. 4, when the process is executed, it may first call the execve system call. By inspecting the value in ebx at the moment when this system call gets executed, the Introspection System may determine the process name. However, the value of CR3 when executing this system call may belong to its parent process. During the execution of this system call, it may release almost all resources belonging to the old process (flush_old_exec) and update the CR3, which is the right moment to acquire the CR3 for the monitored process. Therefore, by monitoring the update of CR3 (a mov instruction), the Introspection System may be able to obtain the desired value because there is no other CR3 update since context switching was disabled.

There is also an alternative approach to monitor all CR3 (essentially the page directory, pgd) values from the boot of the secure-VM and detect the newly used CR3 since a new CR3 belongs to a new process. This approach tracks the life time of a pgd. The instrumentation is to maintain a map between the CR3 and the process. Whenever a process dies (detected through such as exit_group system call), its CR3 is removed from the map. As such, it is able to determine whether a given CR3 belongs to a new process. By tracking the interrupt service routine and disabling the timer for context switches, the system call context identification may be able to largely identify the system call execution context of the monitored process.

However, the system call context identification still may not fully isolate all the system call service routines. For example, the cond_schedule function may be called in many places to determine whether a context switch is needed, including all of the system call exit points. The Introspection System may redirect the data access of this function if there are no other techniques to remedy this. One may not white list this specific function (though that is a viable option); otherwise, the Introspection System design may be too kernel specific (OS-gnostic). Fortunately, the previously mentioned second technique, redirectable data tracking, solves this problem and may automatically tell the data in such a function is not redirectable.

IV. REDIRECTABLE DATA IDENTIFICATION

The redirectable data identification in the Introspection System tracks the kernel data which can be redirected to the in-guest memory. Thus, in one embodiment, it may first be determined what kind of data should be redirected. When writing an introspection program manually, the kernel memory may be traversed starting from the global memory location (exported in the system map file) to reach other memory locations including the kernel heap by following pointers.

As such, one of the basic approaches would be to track and redirect the data which is from global variables or derived from global variables through pointer dereference and pointer arithmetic instructions. Note that at the instruction level, the Introspection System can easily identify the kernel global variables, which are usually literal values after the kernel is compiled and identical for the same OS version for a given global address. By dynamically instrumenting each kernel instruction and checking whether there is any data transitively derived from global variables (a variant of widely used taint analysis), the Introspection System may identify them. The Introspection System may save shadow memory space for data flow tracking.

Since it is a boolean function to determine whether some data is redirectable, instead of tracking all the redirectable data, the Introspection System may track which data is unredirectable. It may be the data dereferenced from stack variables or derived from them because some kernel stack variables manage the kernel control path. They may vary from machine to machine even for an identical OS at a different time. Though the redirectable data tracking is a variant of taint analysis, there are still significant differences.

A. Shadow Memory

Similar to taint analysis, a shadow memory may be used to store the taint bits for memory and all CPU registers. As a non-limiting example, taint information may be kept for memory and registers at byte granularity by using one bit to indicate whether they are redirectable (with value 1) or not (with value 0). However, three pieces of shadow memory may be used—ShadowS and ShadowV for the memory data and ShadowR for registers. ShadowS may be used to track the unredirectable stack address, and ShadowV and ShadowR may be used to track whether the value stored in the stack address or register when used as a memory address needs to be redirected.

Figure 8:
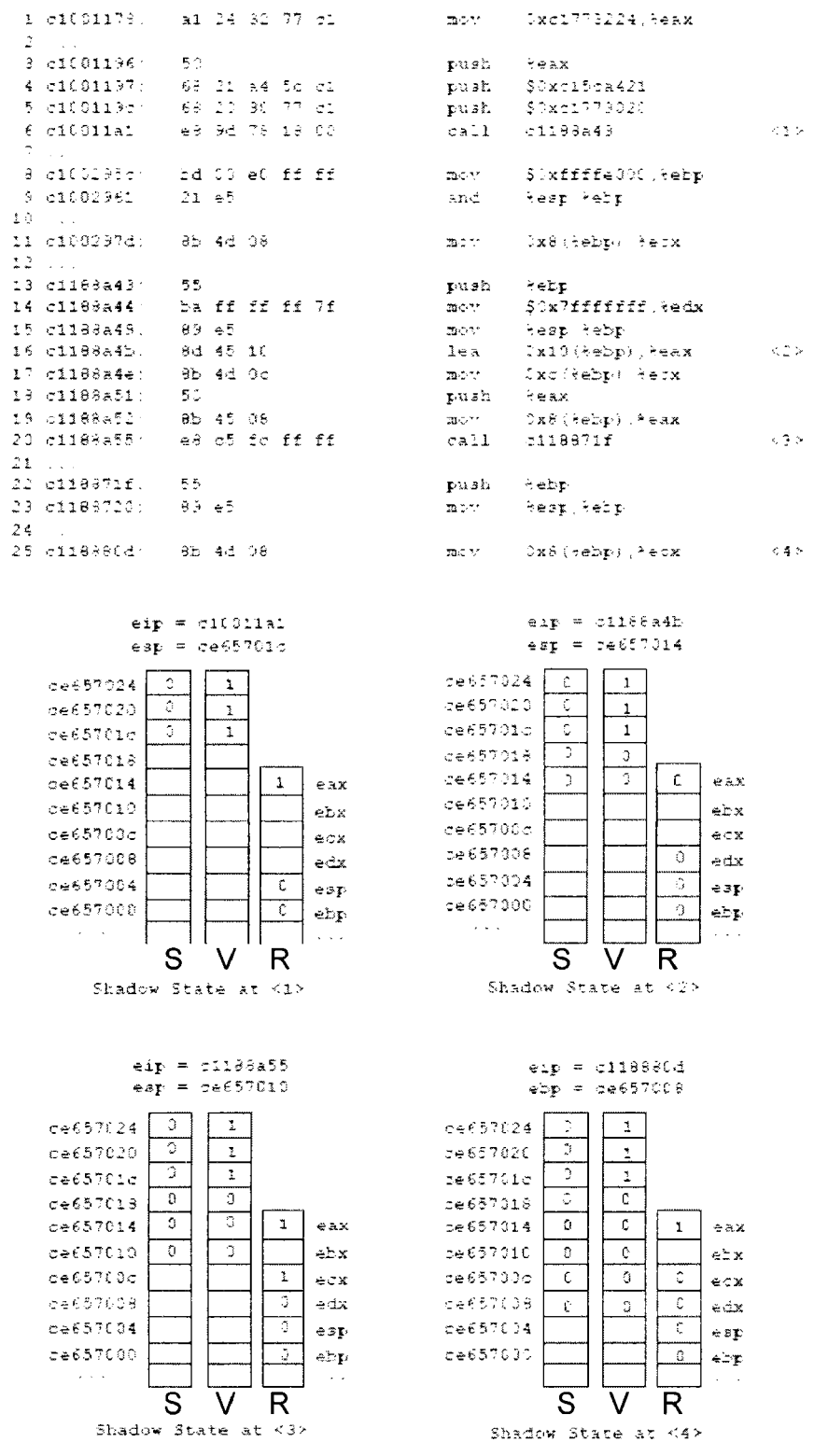

Considering the working example illustrated in FIG. 8, which shows shadow memory state and taint propagation of a working machine introspection system code. S, V, and R represent ShadowS, ShadowV, and ShadowR respectively. If only ShadowS is used, for the instruction at line 17 c1188a4e: mov 0xc(% ebp), % ecx, the taint bit 0 is moved to ecx. Then, when the kernel dereferences the memory address pointed to by ecx, it may not be redirected because of taint bit 0. However, this address may be redirected as this address may actually be a global memory address. In other words, because of pointers, the taint information may be kept for both the stack address and its value.

B. Taint Source

Before the introspection process enters the first monitored system call, the Introspection System may initialize the taint bits for the shadow register and shadow memory. For shadow registers, all may be initialized with 0 (unredirectable), as the parameters passed from the user space are local to the secure-VM 102. For shadow memory, the taint bits may be allocated on demand when the kernel uses the corresponding memory address.

The taint bit for the esp register may be 0. When loading a global memory address (a literal value which falls into kernel memory address space), the taint information for the corresponding register or memory may be set to 1. Some special instructions (e.g., xor eax, eax, sub eax, eax) may reset register value, and consequently their taint bits may be set with 0.

C. Propagation Policy

The propagation policy may determine how the Introspection System may update the shadow state. Similar to other taint analyses, based at least in part on the instruction semantics, the shadow state may be updated. However, if there are two pieces of shadow memory for a given memory address, and the involved stack address and the value are stored in these addresses, there may be significantly different policies.

In one embodiment, for ShadowS, its shadow bit may be updated with 0 whenever a stack address is encountered. ShadowS may be regarded as a book keeping of all the exercised stack address. Later on, when dereferencing a memory address, ShadowS may be queried about whether such an address has been seen before. The taint-bit value in ShadowS (which is 0) may not be involved in any data propagation.

Some embodiments may not use ShadowS because, in practice, nearly all the stack addresses (involved in an x86 instruction) may be computed (directly or indirectly) from esp. For example, as showing in the last two instructions (line 23-25) of the example of FIG. 8, one can infer 0x8(% ebp) is a stack address without querying any ShadowS. One reason ShadowS is kept is to make sure that the stack address will not be redirected. For example, it may have an instruction which actually has a stack address but does not use esp (or its derivation such as ebp) in certain context for address computation.

For ShadowV and ShadowR, in one embodiment, the Introspection System may use the following policies.

(i) Data Movement Instruction—For one-directional data movement A→B, such as mov/movsb/movsd, push, and pop, ShadowR(B) or ShadowV(B) may be updated, with the taint bit in ShadowR(A) or ShadowV(A). For data exchange instructions A↔B, such as xchg, xadd (ADD and Exchange), shadow state for both operand may be updated. Note lea may be a special case of "data movement". It may not load data from memory, but it may load a memory address. Therefore, a check to determine if the source operand generates a stack address may be performed, and if so, the ShadowV or ShadowR of the destination operand may be updated with 0. For example, at line 16 of FIG. 8, a stack address is loaded to eax, and ShadowR(eax) may be updated with 0.

(ii) Data Arithmetic Instruction—As usual, for data arithmetic instructions such as add, sub, xor, shadow state may be updated by ORing the taint bit of the two operands. However, this may only be true for operands which are both global and heap addresses as well as their propagations (to registers and other memory). Note that if one of the operands in these instructions is a literal value but not within kernel address space, there may be no need to update any shadow state. If either of the operands is stack address related, the taint bit may be updated with 0. Considering the instructions in line 8-11 of FIG. 8, ebp may be first tainted with 1 as 0xffffe000 is a literal and within kernel address space; at line 9 when executing and % esp,% ebp, because the taint bit for esp is 0, a new taint bit may be obtained for ebp as 1; next at line 11 of FIG. 8 when dereferencing memory 0x8(% ebp), it will be redirected, which is wrong. Therefore, the stack address may override the normal propagation policy and clear the operand taint.

(iii) Other Instructions—A large body of instructions do not contribute to any taint propagation, such as nop, jmp, jcc, test, etc. For them, only a check whether any memory address involved in these instructions needs to be redirected may be performed. A redirection process of the Introspection System in the illustrative embodiments is presented below.

V. KERNEL DATA REDIRECTION

Having been able to identify the system call execution context and pinpoint the data that needs to be redirected, this section describes non-limiting examples of how the kernel memory access may be redirected. As not all system calls need to be redirected, first, the system call redirection policy is described. Then, a discussion of how the virtual to physical address translation including COW handling is performed is presented. Finally, the redirection process of the Introspection System is disclosed.

A. System Call Redirection Policy

Back in the system call trace of the getpid process (FIG. 4), it was noticed that the system call redirection policy may be fine-grained. That is, based on the semantics of each system call, the Introspection System may determine whether the data access is redirected during the execution. As such, the Introspection System may systematically examine all the system calls.

System calls in general may be classified into the following categories: file access (e.g., open, read, write), network access (e.g., send/recv), message queues (e.g., msgctl), shared memory (e.g., shmat), file descriptor operations (e.g., dup, fcntl), time-related (e.g., getitimer/setitimer), process control related (e.g., execve, brk, getpid), and other system-wide functionality related including accounting and quota (e.g., acct).

As it may be desired to pull the in-guest OS state outside to the VMM, in one embodiment, the following introspection settings are of particular interest: (1) system calls dealing with retrieving (i.e., get) the status of the system and (2) system calls related to file access. Example introspected system calls are summarized in FIG. 9.

The file access related system calls may be of interest because of the proc files in Linux/UNIX. Note that the proc file system is a special file system which provides a more standardized way for dynamically accessing kernel state, as opposed to tracing methods or direct access of kernel memory. Utility programs such as ps, lsmod, and netstat may read proc files to inspect the kernel status. Therefore, it may be desirable to support file read on the proc files. Also, for disk files, there may be no redirection (because virtual machine introspection (VMI) largely deals with memory), and they may be differentiated by tracking the file descriptors. To this end, the Introspection System may maintain a file descriptor mapping whenever the introspected process opens a file, and by checking the parameters it can be differentiated whether the opened file is a proc file.

It is noted that many of the techniques in the Introspection System are OS-agnostic. However, the system call redirection policy, as described, may be OS-gnostic. That is, it uses the specific knowledge of each system call conversion and the semantics for a particular OS. As such, to support other systems such as Microsoft® Windows®, one may scrutinize each Windows® system call to determine whether they are redirectable. Once having this knowledge, it may be trivial to introspect them. For instance, a Windows-XP® (SP2) process ID was successfully introspected by enabling the System redirecting the Windows system call NtQueryInformationProcess (system call number 0x9a) and disabling the stack redirection, while using the alternative approach to track the new CR3 value for the introspection process.

B. Virtual to Physical Address Translation

When dynamically instrumenting each kernel instruction, the Introspection System may only be able to observe the virtual address (or logical address). If a given address is redirectable, the Introspection System may identify its physical address and load the data. That is, the Introspection System may perform the memory management unit (MMU) level virtual to physical address translation.

To this end, in one embodiment, a shadow translation lookaside buffer (TLB) (STLB) and shadow CR3 (SCR3) may be provided in the Introspection System's VMM (i.e., the secure-VM 102), which will be used in the introspection process during address translation if a given address should be redirected. SCR3 is initialized with the guest CR3 value at the moment of introspection. Note, if a snapshot is taken of the guest memory (e.g., for forensics), the Introspection System may log its CR3 and this value will be loaded into the SCR3. Meanwhile, at any moment when the value of CR3 (after the OS has booted) is obtained, all the page table entries of the kernel space in a page directory (pgd) pointed to by any CR3 may be identical, because all processes share the same kernel space. SCR3 may be used for kernel memory address if and only if this address needs to be redirected, and similarly for STLB.

In particular, before the start of an introspection process, STLB may be initialized with zero. When a kernel address a needs to be redirected, the Introspection System may first check whether the STLB misses; if not, the Introspection System may directly obtain the physical address P(a) derived from STLB. Otherwise, the Introspection System may get its P(a) in the guest physical memory by querying SCR3 and performing the three-layer address translation. At the same time, the Introspection System may fill the STLB for address a with the physical address of P(a) such that future reference for the address sharing the same page of a can be quickly located. Also, the STLB entry may be flushed if its entries are full and it may be replaced because there is one SCR3 value. Unlike a regular TLB, all of the STLB entries have to be flushed whenever there is a context switch.

If there is a data write on the redirected data, the Introspection System may perform COW at page level, as it may be desirable to avoid any side effect of the in-guest OS state. This time, the Introspection System may extend one of the reserved bits in page table entries to indicate whether this page is dirty (has been copied) and add one bit to the software STLB entry. Note that this is one of the advantages of instrumenting the VMM because the Introspection System may add whatever it wants in the emulated software, such as the STLB, even though the original hardware may not contain such an extension. Meanwhile, for the page table entry, the Introspection System may extend one of the reserved bits to achieve its goal. The Introspection System may also make a shadow page table and extend it with a dirty bit for page entry if there does not exist any reserved bit.

If there is a memory write on a, the Introspection System may first check whether STLB hits. If so, the Introspection System may check whether the target page is dirty by querying the dirty bit in the STLB entry. If it is, then the Introspection System may directly derive its physical address from the STLB. Otherwise, if the page is not dirty (marked in the STLB entry) or STLB misses, the Introspection System may perform the three-layer address translation by querying SCR3 and the page tables. Next, the Introspection System may check if the target page is not dirty (the first time data write on this page). The Introspection System may perform a target page copy and redirect the future access of this page to the new page. In the meantime, the Introspection System may set the dirty bit of the target page table entry and the STLB entry as well. If it is already dirty, the Introspection System does not copy the target pages and sets the STLB entry and the dirty bit. This is because next time any data write to this page will not have a problem as the whole page has already been copied.

C. Directing the Access

For the details of the final data redirection procedure, FIG. 10 illustrates example program code for redirecting kernel data according to an illustrative embodiment. As shown in this embodiment, for each kernel instruction i, the Introspection System may check whether its execution is in a system call context (line 3). If so, the Introspection System may check whether the current system call data access needs to be redirected (line 4). If not, there will be no instrumentation for i.

Next, the Introspection System may perform the redirectable data tracking for i (line 5). That is, check each operand, and update the shadow state. After that, for each memory address access (other than the instruction address) involved in i (line 6), if it is a data read (line 7), the Introspection System may invoke the virtual to physical address translation function to get the corresponding address (line 8), and load the data (line 9). Otherwise (line 10), the Introspection System may check whether the target page is dirty or not (line 11). If not, the Introspection System may perform the COW operation (line 12) and update the page entry dirty bit, copying the page if necessary (line 13). After that, the Introspection System may obtain its physical address (line 14) and perform the write operation (line 15).

From the process in FIG. 10, the Introspection System may also notice that the data redirection engine (line 5-15) may work in any other kernel execution context as long as it can be informed. For instance, the Introspection System may inspect and redirect the kernel data access in a particular kernel function, e.g., in a regular kernel module routine, or a user developed device driver routine. This is another benefit of the Introspection System. That is, the Introspection System allows end-users to customarily inspect a specific chunk of kernel code in a context as long as the end-user can inform the start and end address or the Secure-VM can automatically sense them through particular instructions.

VI. IMPLEMENTATION

In this section, example implementation details of interest are shared, especially how each instruction is dynamically instrumented in the most recent QEMU, how the interrupt execution context is intercepted at VMM layer, and how the MMU is managed with respect to the new STLB.

Dynamic Binary Instrumentation—There are quite a few publicly available dynamic binary instrumentation frameworks built on top of QEMU (e.g., Argos, TEMU). However, their implementations are scattered across the entire QEMU instruction translation, and redirectable data tracking in the Introspection System can be implemented more simply. The Introspection System takes a more general and portable approach. In particular, the Introspection System may leverage the XED library for its dynamic instrumentation. Upon the execution of each instruction, the Introspection System may invoke XED decoder to disassemble it and dynamically jump to its specific instrumentation logic for performing the redirectable data identification. One example benefit is such an approach may allow the Introspection System to largely reuse a prior PIN-based dynamic data flow analysis code base.

Interrupt Context Interception—The beginning execution of a hardware level interrupt or software level interrupt (i.e., exception) for the x86 architecture in QEMU may be mainly processed in the function do_interrupt_all. This function may be instrumented to acquire the interrupt number, and determine whether it is a hardware or software interrupt. After the secure-VM (QEMU in this case) executes this function, it may pass the control flow to OS kernel. The kernel may then subsequently invoke the interrupt handler to process the specific interrupt. A part of an interrupt hander (top-half) may finish and return with a ret instruction. After that, the kernel may invoke a context switch, and after it switches back or no context switch happens, the interrupt hander may return with an iret. By capturing the beginning and ending of an interrupt (the pair), the Introspection System may identify the interrupt execution context.

Memory Management Unit (MMU) Management with STLB—Emulator-based VMM often has to emulate the real hardware MMU. In QEMU, it is handled in i386-softmmu module for the x86 architecture. For virtual to physical address translation, the original TLB handling code and data structures were largely mirrored and extended (e.g., tlb_fill, tlb_set_page, tlb_table) in the STLB implementation. For load and store, QEMU actually differentiates code and data when translating the code (e.g., generating Idub_code for the instruction load). Therefore, the data load and store macro helper functions may be instrumented in QEMU.

VII. ADDING CONFIGURATION AND RECOVERY FUNCTIONALITY TO INTROSPECTION SYSTEM

From a security perspective, the traditional program execution model has at least the following issues: (1) In-VM programs (e.g., hostname, rmmod, ps) and kernel states are directly faced by user level, as well as kernel level malware, and they can often be attacked. For instance, malicious processes and device drivers (or kernel modules) can hide from in-VM system enumeration tools (e.g., ps, lsmod) and can be immune to attempts of removal or disabling. (2) End-users or administrators often have to be authenticated before running in-VM programs to update the kernel state, which may not be ideal for a timely response to intrusions (e.g., kill a rootkit hidden process), especially for cloud providers who in many cases do not have a user account in the guest-OS.

Figure 11:
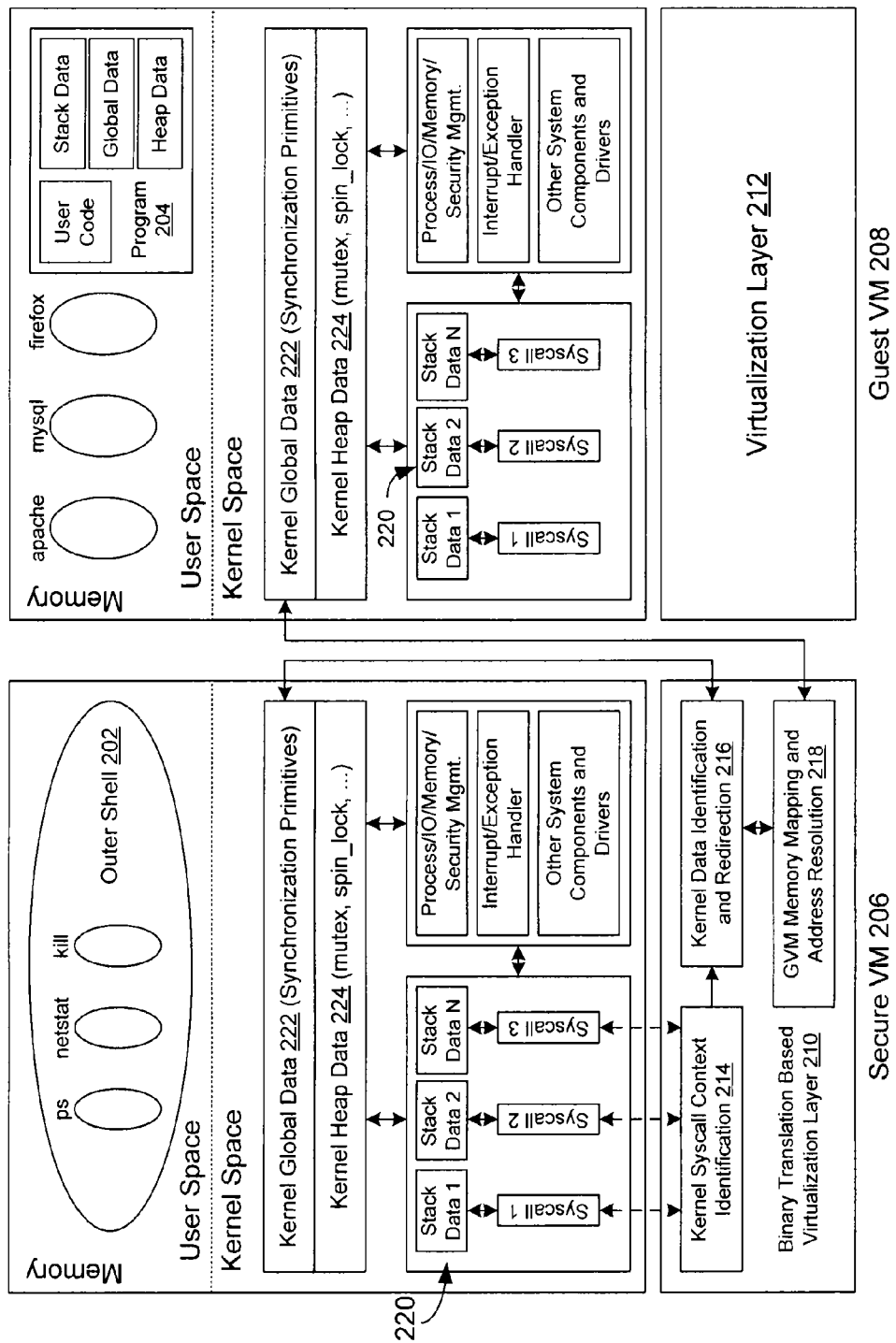
FIG. 11 is a schematic, pictorial representation of a machine introspection, reconfiguration, and recovery system according to an illustrative embodiment.

FIG. 11 is a schematic, pictorial representation of a machine introspection, reconfiguration, and recovery system 200 according to an illustrative embodiment. As shown in FIG. 11, the Introspection System 100 (FIG. 1) is extended to provide a new program execution model in which programs may be executed in an outer shell 202 for a guest-OS administration, with the same effect in terms of kernel state updates akin to running the programs 204 inside the guest-VM. The in-VM kernel state may be updated entirely from the outside. The trustworthiness of out-of-VM programs is thus ensured because they are located out-of-VM and there is a world switch (far from reaching) with the in-VM programs such as the in-VM malware. Also, authentication may not be required, and the trusted out-of-VM programs may be executed in an outer-shell which is outside control of the in-VM software.

A dual-VM architecture may be employed with a secure VM 206 (SVM) and guest VM 208 (GVM). Specifically, a trusted, corresponding guest-OS kernel with the same version may be installed in a separate SVM 206, over which full control is retained and on which native administration utilities may be executed and memory redirection may be performed. Through running the trusted binary code in the monitored SVM 206, various embodiments transparently redirect the memory read and write operations of kernel memory from SVM 206 to GVM 208, thus modifying the state of the GVM 208. Therefore, the outer shell 202 for the GVM 208 is actually located in the SVM 206, and now trusted, native, widely tested administration utilities may be executed in the SVM 206 to timely supervise the state of GVM 208, including introspection and reconfiguration of guest-OS kernel state as well as recovery and response to intrusions.

Normally, a given program runs on top of a given OS within a shell. In various embodiments, the Introspection System 200 changes this model and supports running programs completely outside of the OS with the same effect as running the program inside in terms of kernel state update, thanks to the powerful, programmable VMM. A direct outcome is that the trusted administration utilities can be executed to reconfigure the guest-OS and respond quickly to intrusions such as recovering the system from attacks (e.g., kill a rootkit created process, and rmmod a malicious kernel module) entirely from out of-VM, without any user account inside the guest-OS. Therefore, the administration of the guest-OS is made easier. Various embodiments facilitate a timely response to intrusions detected in the guest-OS.

There are a number of reasons for out-of-VM program execution to manage the guest-OS. Besides benefits such as isolation, portability, and reliability while implementing the service out-of-VM, the following additional benefits may be obtained.

Trustworthiness—Recent cyber attacks such as kernel rootkits have pushed defense software into the hypervisor or even hardware layers (i.e., out-of-VM). It may be much harder for attackers to tamper with the software running out-of-VM, because there is a world switch for the attacks from in-VM to out-of-VM (unless the VMM has vulnerabilities). Therefore, a higher trustworthiness of the out-of-VM software may be gained. For instance, it may be guaranteed that the administration utilities (e.g., ps) are not tampered before using them to manage a guest-OS in the SVM 206 as the SVM 206 is not directly faced by attackers.

Higher Privilege and Stealthiness—Traditional security software (e.g., anti-virus, or host intrusion detection) runs inside the guest-OS, and in-VM malware can often disable the execution of these software. By moving the execution of security software out-of-VM, higher privilege (same as hypervisor) and stealthiness can be achieved to make the security software invisible to attackers. For instance, malicious code (e.g., kernel rootkit) may disable the ps command from showing the running malicious process, and may disable the rmmod command needed to remove a kernel module. Through enabling the execution of these commands out-of-VM, higher privilege and stealthiness may be achieved to prevent the rootkits from tampering with the security software.

Automation—When an intrusion is detected, an automated response may be desired. Current practice may be to notify the administrators or execute some automated responses inside the guest-OS. Unfortunately, again any in-VM responses can be disabled by attackers because they run at the same privilege level. However, in various embodiments of the present disclosure, running software out-of-VM may be supported, and actions may be taken quickly to stop and prevent the attack without the help from any in-VM root privileges. Various embodiments may be integrated with intrusion detection software and provide a timely response to attacks, such as to kill a rootkit created hidden process or rmmod a hidden malicious kernel module.

According to various embodiments, the approach outlined herein uses a dual-VM execution architecture with a kernel system call context aware scheme that monitors the instruction execution of the trusted utilities at the SVM 206, and transparently redirects each individual piece of a memory update, at binary code instruction level from SVM 206 to GVM 208 when the system call of interest gets executed, to achieve state introspection, (re)configuration and recovery for GVM 208.

For instance, considering running sysctl(8) to configure the kernel parameters, as shown in FIG. 12, there are in total 57 system calls, and only four of them (highlighted in FIG. 12) are of interest because these system calls are responsible to tune the kernel parameters. If the kernel data access of these four system calls can be redirected, the same effect of configuring the kernel from outside VM can be achieved.

More specifically, suppose it is desired to implement a new out-of-VM program program_out, which could be a state inspection program (e.g., ps, lsmod, netstat), a configuration or attack recovery program (e.g., kill, rmmod). The execution context of the original in-VM program can be reused: program_in =code_in (user data, kernel data) with the same user data, but with different kernel data. However, the kernel stack data is not reused because the data in the stack is transient and mostly related to kernel control flow. Therefore, in order to implement program_out, the following relationships are observed:

Program_out=code_out (user data, kernel data)=code_in (user data, modified kernel data)=code_in (user data, {kernel stack data, modified kernel heap data, modified kernel global data}), where program_out is the new out-of-VM program; code_out=code_in, the modified kernel heap and global data are from the GVM 208; and code_in, user data, and the kernel stack data are from the SVM 206. Interestingly, the semantic gap is automatically bridged for the out-of-VM program program_out that is running in the SVM 206. This is because the new program_out satisfies code_out (user data, kernel data)=code_in (user data, modified kernel data) by reusing the legacy binary code code_in of program_out. In other words, program_out can use all the system calls, APIs invoked by itself in the SVM 206, and it transparently updates the state of the modified kernel data of the GVM 208 and achieves the same effect of running the corresponding program_in in the GVM 208, but with a higher trustworthiness.

Architecture Overview—An overview of an exemplary Introspection System supporting updating and reconfiguration is presented in FIG. 11. To monitor the kernel instruction level memory access, the SVM 206 may be based on the instruction translation-based virtualization layer (VMM) 210. As a non-limiting example, the open source QEMU may be used. The GVM 208 may be based on any virtualization layer 212, such as XEN®/KVM/VSPHERE/HYPERV. In one embodiment, there are three primary components configured in the SVM 206 at its binary translation-based VMM-layer 210. Specifically, to precisely isolate the target process execution context in kernel space, a Kernel System Call Context Identification 214 component is employed, which identifies the target process and thread execution context in the kernel space at the system call granularity in the SVM 206. During the execution of a program, it may be that not all the system call related data is of interest to a memory access. Kernel System Call Context Identification 214 may also pinpoint which system call context needs the kernel global data and kernel heap redirection. In addition, it may identify interrupt execution context to filter the redirection of synchronization primitives.

After that, a second component providing Kernel Data Identification and Redirection 216 may intercept the data access of in-guest kernel global data and kernel heap data, when the particular system call of interest gets executed. In the meantime, it sends the GVM 208 data read-and-write request to a third component, GVM Memory Mapping and Address Resolution 218. The GVM Memory Mapping and Address Resolution 218 component is responsible for mapping the physical memory of GVM 208, resolving the corresponding kernel virtual address, and performing the read and write operations of the memory access to the GVM 208.

Kernel System Call Context Identification—The Kernel System Call Context Identification 214 may be configured to identify the target-process kernel-level execution context, and pinpoint the exact system call context at the VMM layer.

Identifying Process Kernel Execution Context—Modern OSes running in the x86 architecture grant each process a private page directory that is often pointed by a control register CR3, and the value of the CR3 can hence be used to differentiate the process execution context. In addition to using CR3 to differentiate the process execution context, the process name may be retrieved to pin-point the targeted process (such as ps, kill, rmmod). Kernel data structures (e.g., task_struct) could be traversed to retrieve such information. Alternatively, the system call arguments (e.g., the argument of execve(2)) of process creation may be inspected to make the system more OS-agnostic.

A process could run with multiple threads. Using CR3 and process name can pin-point the process execution context but may not be able to precisely isolate the specific system call context. This is because all of the threads for the same process can execute system calls. As such, the thread context may be differentiated for the same process at VMM layer.

However, the Linux kernel may not have any thread specific support (to the Linux kernel, a thread may be uniformly treated as a process) and multi-threading may be implemented at user level (e.g., pthread library which takes care of creating unique stack address for each thread). In fact, when using pthread_create to create a new thread, this function may use the system call clone(2) that has a user specified virtual address for child stack, instead of the default process fork(2).

While multi-threads for the same process may share the same CR3 (i.e., threads share the same virtual address), each process at kernel level may have a unique kernel stack 220 that is dynamically allocated, which can be used to isolate the thread execution context at kernel level. Therefore, in various embodiments, CR3, process name, and kernel esp register (e.g., with a lower 12 bits cleared by mask) may be used together to uniquely differentiate and isolate the fine-grained thread execution context.

Identifying Specific System Call Execution Context— After having been able to identify the fine-grained thread execution context, the specific system call context may be further identified under the target process execution. Note that system calls are the exported OS services. As illustrated in FIG. 12, user level processes may invoke system calls to request the OS services, such as file access.

Since the SVM 206 monitors the instructions executed inside the computer system, the entry point and exit point of the system call execution may be intercepted. Specifically, in the x86 architecture, system call execution may have unique instruction pairs. In the Linux kernel, they are int 0x80/iret and sysenter/sysexit (this pair is used since kernel-2.5). The specific system calls may be indexed by register eax when invoking a system call. Therefore, by monitoring these instructions, the entering (int 0x80/sysenter) and exiting (iret/sysexit) of a system call can be detected.

Unfortunately, the kernel level execution between a system call entry point and a system call exit point is not entirely for the execution of this system call. Other than the normal control flow such as call/ret/jump, as illustrated in FIG. 11, kernel control flow may also be driven by asynchronous events: interrupt (e.g., context switch timer) and exception (e.g., page fault). These events will be responsible for managing the system resources and executing device drivers. These execution contexts may be identified, and their data access of kernel global data 222 and kernel heap data 224 may be excluded (many of the spin_locks and mutexes are accessed in these context). Otherwise, when reading these data from the GVM 208, the SVM kernel may enter an inconsistent state (such as deadlock) and even crash during the execution of these execution contexts. For instance, if the page fault handler of the SVM 206 is about to allocate new pages for a process, but reads a different state from the GVM 208, it will likely render the page fault handler unusable.

The kernel has such a very complicated, unpredictable control flow, but the system call execution context can be identified. These asynchronous events may be driven by interrupts and exceptions, and the SVM 206 emulates these hardware level resources. As such, the beginning execution of these events is identified because the SVM 206 controls the hardware. The end of these events has an iret instruction, which can also be captured. Meanwhile, the bottom up handlers of an interrupt and exception may be executed during context switch. The SVM 206 may control the interrupt and timer, and hence may control the context switch. Therefore, the SVM 206 may be able to identify the system call execution of the target process and keep it running successfully in the SVM 206.

Eventually, the output of the first component may provide the execution context of the system calls, excluding any other kernel execution such as context switch and interrupt (and exception) handler. Next, the second component will perform the identification of kernel global data 222 and kernel heap data 224 accessed during the system call execution of interest (for example, 4 out of 57 system calls may be of interest when executing sysctl(8)).

Kernel Data Identification and Redirection—This component 216 intercepts the data access, pinpoint the kernel global data 222 and the kernel heap data 224, and reads data from or writes data to the memory in the GVM 208, while executing the monitored system call of interest.

Identifying Kernel Global Data and Kernel Heap Data during a System Call Execution—Similar to user level stack data, kernel stack data 220 is also transient. While kernel stack data 220 does contain some localized state variables, it may not contribute to the state of kernel introspection, configuration, and recovery. Kernel global data 222 and kernel heap data 224 are the memory regions that store the persistent kernel state. Therefore, a focus may be to identify these kernel global data and kernel heap data when the system call of interest gets executed.

After a kernel is compiled, the addresses of kernel global data 222 become literal values in kernel instructions. As such, the kernel global data 222 may be identified by simply looking at the address ranges of the literal values. Then the kernel heap data 224 may be identified, for example, by identifying all the kernel stack data 220 and excluding them, since a kernel data x either belongs to kernel stack data 220, kernel global data 222, or kernel heap data 224.

The kernel stack data 220 may be identified by monitoring all the instructions. It may be determined whether x is in kernel stack data 220 by looking at the address range. However, kernel stack data 220 is also dynamically allocated from kernel heap data 224. On the other hand, kernel stack data 220 often has data dependencies with the kernel stack pointer (esp). Therefore, in one embodiment, a stack data dependence tracking approach is leveraged to track the data directly and indirectly derived from kernel stack pointer esp. This approach is a variant of taint analysis. In this scenario, any data derived from stack pointer esp as well as their propagations will be tainted by instrumenting data movement and data arithmetic instructions. Then for a given kernel address x, if its taint bit is set, then it belongs to kernel stack data 220; otherwise, it is kernel global data 222, or kernel heap data 224.

Enumerating System Calls of Interest—Recall as illustrated in FIG. 12, not all the system calls contribute to the kernel state inspection and update, and it is desired to systematically enumerate the system calls of our interest. This enumeration is often application-specific and may be done by kernel experts rather than end users of the system described herein. In particular, after manually examining all the system calls, those of interest are classified into the following three categories:

(1) Inspection—In order to reconfigure the OS or recovery from an attack, the OS is introspected to get its current status and perform the response. Many user level utilities such as ps(1), lsmod(8), lsof(8), netstat(8) are designed for this inspection purpose. Interestingly, these utilities read proc files to inspect the kernel state. Therefore, file access related system calls: open(2), read(2), fstat(2), stat(2), lseek(2), readv(2), readdir(2), close(2) are of particular interest. Note that Linux kernel leverages proc files to enable user-level program accessing kernel state.

(2) Configuration—Similar to the inspection, many configuration utilities such as sysctl(8) use write(2) to change the kernel state through proc file system. Therefore, write(2) is of interest. In addition, there is also a sysctl(2) system call for kernel to directly change its parameters. Meanwhile, other system calls such as socket(2), ioctl(2) (for route(8)) and nice(2) may be of interest because they can also dynamically change the kernel state.

(3) Recovery—Upon detection of a kernel attack such as a hidden malicious process or a hidden device driver in the GVM 208 (using the inspection utility in the SVM 206 to introspect the GVM 208 for instance), the offending code needs to be removed from the guest kernel. Therefore, system calls kill(2) and delete_module(2) are also of interest.

Identifying Synchronization Primitives in System Calls—While many synchronization primitives are executed in the interrupt context, some system calls also do contain them. For instance, delete_module(2) call spin_lock, spin_unlock, two functions widely used in kernel synchronization, to lock and unlock the modlist_lock that is a kernel global variable. As such, the data redirection of modlist_lock may be filtered in one embodiment. White-listing the program counters (PCs) of the involved instructions may be performed. However, this may be tedious, challenging, and also kernel-specific (such analysis is performed for each kernel to filter these PCs).

After analyzing the instruction sequences of these synchronization primitives, a systematic solution may be employed to identify their execution contexts by looking for the particular instruction sequences of the synchronization primitives. Specifically, as illustrated in FIG. 13, when executing a function prologue in the SVM 206 (say push ebp or even at xadd instruction in FIG. 13), these instruction sequences are forward scanned (the scanning window is determined by each specific primitive), and if they fall into the sequences of kernel synchronization primitives such as spin_lock (identified, for example, by the byte sequence "55 ba 00 . . . f6 5d c3") and spin_unlock, or _up and _down (for a semaphore), the data redirection is filtered for these primitive functions. These instruction sequence patterns may be stable across different kernels.

Mapping the GVM Memory Address—Having identified a given kernel address x in the system call of interest that belongs to kernel global data or kernel heap data, the executing instruction is dynamically instrumented to make it fetch the data from, and write the data to, the physical memory (PM) of the GVM 208. This is achieved by the third component, GVM Memory Mapping and Address Resolution 218.

GVM Memory Mapping—Various embodiments employ two approaches to map the PM of the GVM 208 to the SVM 206. One is online mapping, which directly maps the pages that belong to the GVM 208 to the SVM 206 with the support from the VMM (i.e., hypervisor). The other is offline mapping, which directly takes the memory snapshot of the GVM 208 and attaches it to the SVM 206; once the update is finished in the SVM 206, the updated memory is restored to the GVM 208.

As the SVM 206 uses binary code translation based virtualization (or emulation), it may execute in a host OS. Depending on whether the underneath hypervisor of the GVM 208 is hardware-based or software-based, two different strategies may be used.

Mapping Software Virtualization Based GVM—When a GVM 208 uses software virtualization (such as QEMU), there are also two situations. One is if the GVM 208 also resides in the host OS with the SVM 206, then to the SVM 206, the GVM 208 is just another process and inter-process communication between the two VMMs may be employed to share the physical memory of the GVM 208. The other is that the GVM 208 resides in a different host OS, and the memory snapshot of the GVM 208 is transferred to the SVM 206, or just the references and updates to save the network bandwidth. For both situations, a host or network stub is developed in the VMMs of the SVM 206 and the GVM 208 for the communication.

Mapping Hardware Virtualization Based GVM—A GVM 208 could also run on top of hardware virtualization such as XEN®. In this case, the hypervisor underneath is able to identify the page frames which belong to the GVM 208. Also, if the host VM of the SVM 206 running in the same hypervisor with the GVM 208, then the hypervisor is able to map the memory of the GVM 208 to the SVM 206. Otherwise, the memory images of the GVM 208 is transferred to the SVM 206 through network communications.

Figure 14:
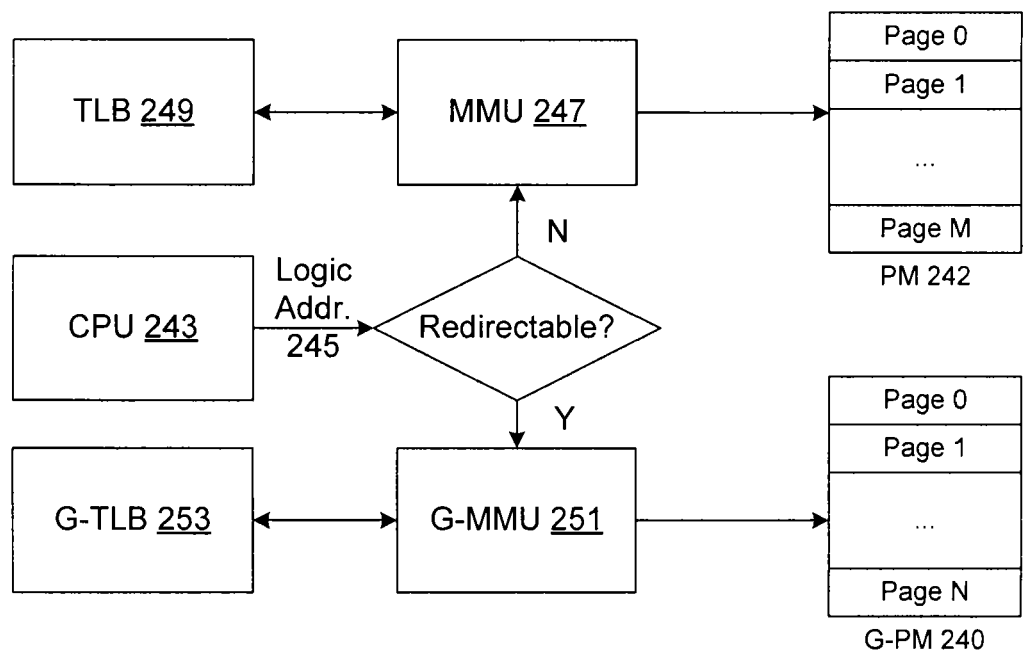
FIG. 14 depicts an exemplary virtual memory management extension of a secure virtual machine to map and resolve a physical memory address of a guest virtual machine according to an illustrative embodiment.

GVM Memory Address Resolution—Referring to FIG. 14, after having performed the mapping of the GVM 208 physical memory (G-PM) 240 to the SVM 206, the G-PM 240 is just another piece of added physical memory (PM) 242 no matter whether the GVM 208 is software or hardware virtualization based. Note that PM 242 and G-PM 240 could have different sizes since they may be in two different machines. Next, the hypervisor of the SVM 206 is instrumented to transparently access it.

More specifically, as illustrated in FIG. 14, a CPU operates with virtual address (i.e., logic address) 245, and MMU 247 (a hardware component) together with a TLB 249 responsible for translating the virtual address to physical address (V2P). The TLB 249 is used as a cache to avoid the expensive page table lookup while performing the V2P. For a given redirectable kernel address x, the page tables may be traversed to perform its V2P. However, this may be expensive as each time there may be three memory references. Therefore, a software-translation based VMM is extended with a G-MMU 251 (the GVM's MMU) and G-TLB 253 (the GVM's TLB) component, which performs virtual-to-physical address translation in G-PM 240 instead of the original PM 242, as shown in FIG. 14.

Also, while performing the V2P for a redirectable kernel address x, the address of the page directory (PGD) of the GVM 208 is to be obtained. In x86 architecture, the PGD is stored in the control register CR3. Therefore, the value of CR3 may be retrieved from GVM 208 when the mapping is performed.

The GVM Status During the SVM Updating—When the SVM 206 is updating the memory of the GVM 208, there could be some concurrency issues if the GVM 208 is executing as well. Therefore, in one embodiment, during the update, the GVM 208 execution is paused and resumed once the update finishes.

VIII. CONCLUSION

The design, implementation, and evaluation of certain illustrative embodiments of the Introspection System are presented. Such embodiments automatically bridge the semantic gap and generate VMI tools. Through system wide instruction monitoring at VMM layer, the Introspection System may automatically identify the introspection related kernel data and redirect their access to the in-guest OS memory (which could be directly attached or from a snapshot). The experiments demonstrated that the Introspection System offers a number of new features and capabilities. Particularly, it may automatically enable the in-guest inspection program to become an introspection program and largely relieve the procedure of developing customized VMI tools. Finally the Introspection System may significantly remove the roadblock in VMI-based security including malware analysis and memory forensics and may largely change their future daily practice.

Figure 16:
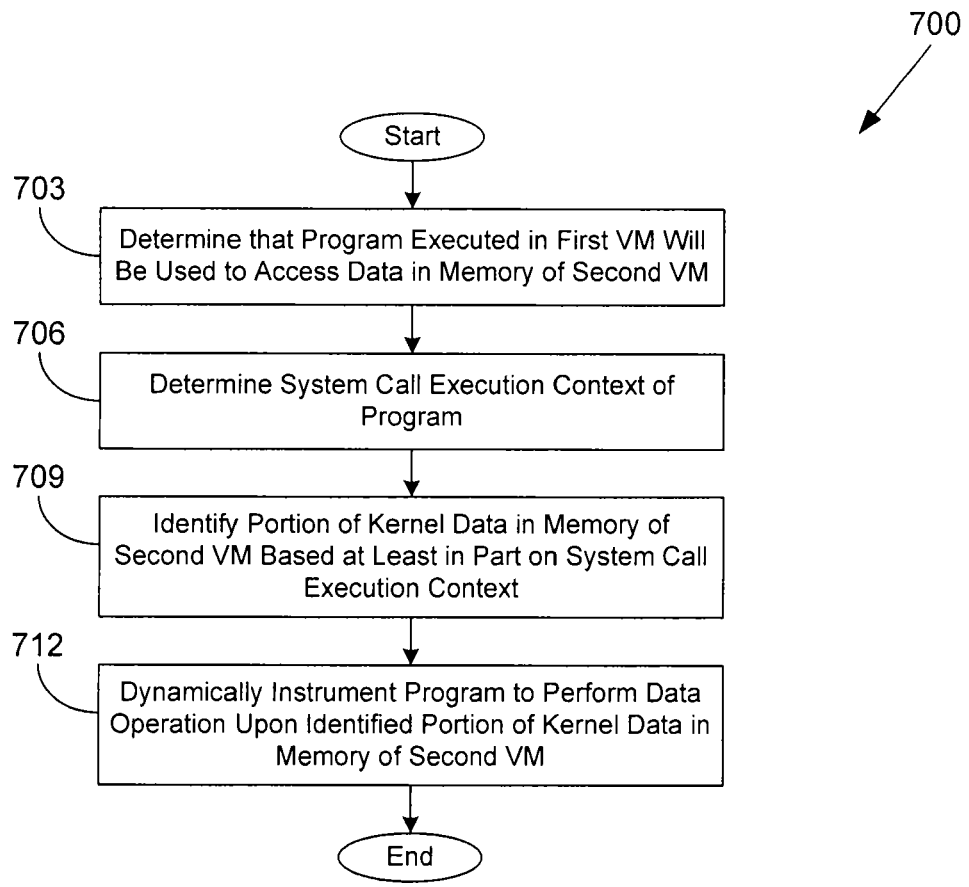
FIG. 16 is a flowchart illustrating one example of functionality implemented as portions of an introspection system of FIG. 1 or 11 according to various embodiments of the present disclosure.

Referring to FIG. 16, a block diagram of a computing device 602 is shown in which the illustrative embodiments may be implemented. The computing device 602 may be an example of a computing device used in FIG. 1, or any computing device for implementing the Introspection System. Computer-usable program code or instructions implementing the processes used in the illustrative embodiments may be located on the computing device 602. The computing device 602 includes a communications fabric 603, which provides communications between a processor unit 605, a memory 607, a persistent storage 609, a communications unit 611, an input/output (I/O) unit 613, and a display 615.

The processor unit 605 serves to execute instructions for software that may be loaded into the memory 607. The processor unit 605 may be a set of one or more processors or may be a multi-processor core, depending on the particular implementation. Further, the processor unit 605 may be implemented using one or more heterogeneous processor systems in which a main processor is present with secondary processors on a single chip. As another illustrative example, the processor unit 605 may be a symmetric multi-processor system containing multiple processors of the same type.

The memory 607, in these examples, may be, for example, a random access memory or any other suitable volatile or non-volatile storage device. The persistent storage 609 may take various forms depending on the particular implementation. For example, the persistent storage 609 may contain one or more components or devices. For example, the persistent storage 609 may be a hard drive, a flash memory, a rewritable optical disk, a rewritable magnetic tape, or some combination of the above. The media used by the persistent storage 609 also may be removable. For example, a removable hard drive may be used for the persistent storage 609.

The communications unit 611, in these examples, provides for communications with other data processing systems or communication devices. In these examples, the communications unit 611 may be a network interface card. The communications unit 611 may provide communications through the use of either or both physical and wireless communication links.

The input/output unit 613 allows for the input and output of data with other devices that may be connected to the computing device 602. For example, the input/output unit 613 may provide a connection for user input through a keyboard and mouse. Further, the input/output unit 613 may send output to a processing device. The display 615 provides a mechanism to display information to a user, such as a graphical user interface.

Instructions for the operating system and applications or programs are located on the persistent storage 609. These instructions may be loaded into the memory 607 for execution by the processor unit 605. The processes of the different embodiments may be performed by the processor unit 605 using computer-implemented instructions, which may be located in a memory, such as the memory 607. These instructions are referred to as program code, computer-usable program code, or computer-readable program code that may be read and executed by a processor in the processor unit 605. The program code in the different embodiments may be embodied on different physical or tangible computer-readable media, such as the memory 607 or the persistent storage 609.

Program code 617 is located in a functional form on a computer-readable media, or computer-readable storage media, 619 and may be loaded onto or transferred to the computing device 602 for execution by the processor unit 605. The program code 617 and the computer-readable media 619 form computer program product 621 in these examples.

In one example, the computer-readable media 619 may be in a tangible form, such as, for example, an optical or magnetic disc that is inserted or placed into a drive or other device that is part of the persistent storage 609 for transfer onto a storage device, such as a hard drive that is part of the persistent storage 609. In a tangible form, the computer-readable media 619 also may take the form of a persistent storage, such as a hard drive or a flash memory that is connected to the computing device 602. The tangible form of the computer-readable media 619 is also referred to as computer recordable storage media.

Alternatively, the program code 617 may be transferred to the computing device 602 from the computer-readable media 619 through a communication link to the communications unit 611 or through a connection to the input/output unit 613. The communication link or the connection may be physical or wireless in the illustrative examples. The computer-readable media 619 also may take the form of non-tangible media, such as communication links or wireless transmissions containing the program code 617. In one embodiment, the program code 617 is delivered to the computing device 602 over the Internet.

The different components illustrated for the computing device 602 are not meant to provide architectural limitations to the manner in which different embodiments may be implemented. The different illustrative embodiments may be implemented in a data processing system including components in addition to or in place of those illustrated for computing device 602. Other components shown in FIG. 16 can be varied from the illustrative examples shown.

As one example, a storage device in the computing device 602 is any hardware apparatus that may store data. The memory 607, the persistent storage 609, and the computer-readable media 619 are examples of storage devices in a tangible form.

In another example, a bus system may be used to implement the communications fabric 603 and may be comprised of one or more buses, such as a system bus or an input/output bus. Of course, the bus system may be implemented using any suitable type of architecture that provides for a transfer of data between different components or devices attached to the bus system. Additionally, the communications unit 611 may include one or more devices used to transmit and receive data, such as a modem or a network adapter. Further, a memory may be, for example, the memory 607 or a cache such as found in an interface and memory controller hub that may be present in the communications fabric 603.

Figure 15:
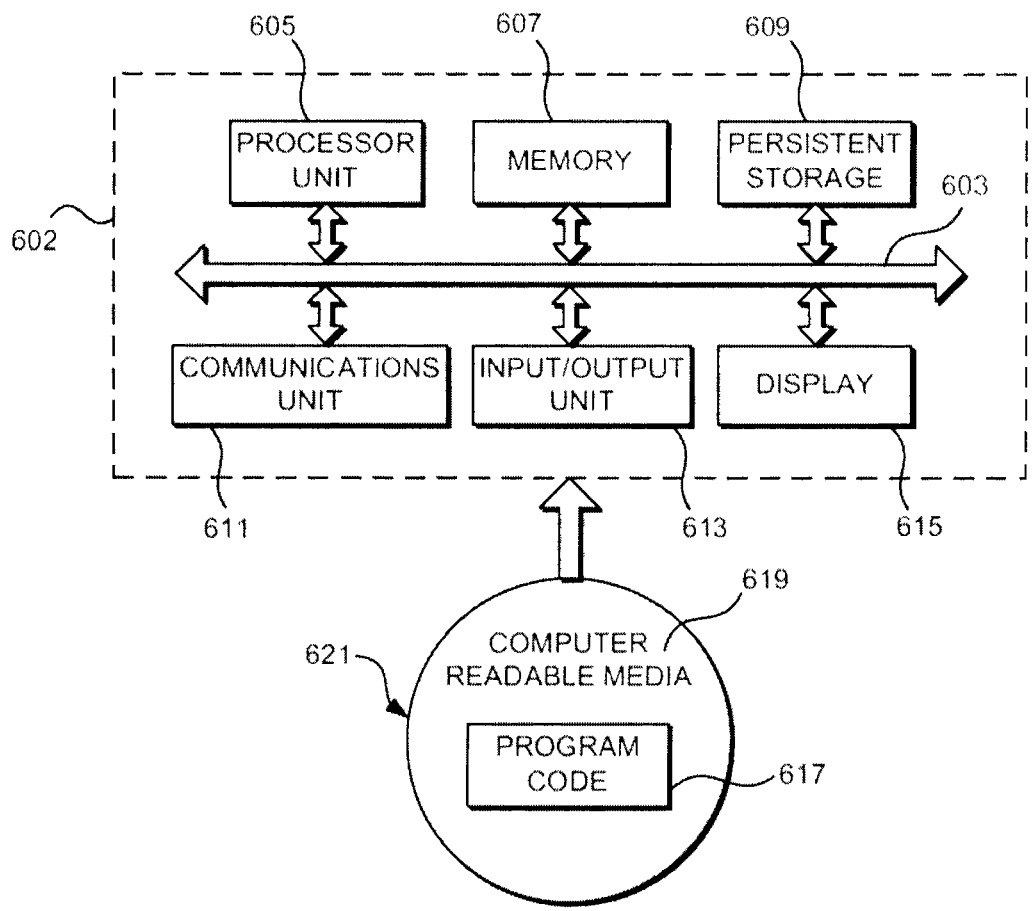
FIG. 15 is a schematic, block diagram of a data processing system in which the illustrative embodiments may be implemented.

Turning now to FIG. 16, shown is a flowchart 700 that provides one example of the operation of a portion of the introspection system 100 (FIG. 1) or the machine introspection, reconfiguration, and recovery system 200 (FIG. 11) according to various embodiments. It is understood that the flowchart of FIG. 16 provides merely an example of the many different types of functional arrangements that may be employed to implement the operation of the portion of the introspection system 100 or the machine introspection, reconfiguration, and recovery system 200 as described herein. As an alternative, the flowchart of FIG. 16 may be viewed as depicting an example of steps of a method implemented in the computing device 602 (FIG. 15) according to one or more embodiments.

Beginning with box 703, it is determined that a program executed in a first virtual machine will be used to access data in a memory of a second virtual machine. For example, the first virtual machine may correspond to a trusted virtual machine, and the second virtual machine may correspond to an untrusted virtual machine. In box 706, a system call execution context is determined for the program. For example, a thread execution context may be isolated based at least in part on a page directory pointer, a process name, and a kernel stack pointer.

In box 709, a portion of the kernel data in the memory of the second virtual machine is identified based at least in part on the system call execution context. To this end, redirectable data in the kernel data may be identified. In one embodiment, the portion of the kernel data may be identified by way of a taint analysis that distinguishes kernel stack data from other kernel data such as global data and heap data.

In box 712, the program is dynamically instrumented to perform a data operation upon the identified portion of the kernel data in the memory of the second virtual machine, rather than the kernel data in a memory of the first virtual machine. In other words, the program is configured to access or modify the redirectable data of the second virtual machine. In one embodiment, an offline mapping of the redirectable data may be performed. In another embodiment, an online mapping of the redirectable data may be performed. Thereafter, the flowchart 700 ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
   at least one computing device;
   a first virtual machine executable by the at least one computing device;
   a second virtual machine executable by the at least one computing device;
   a shadow memory that stores taint bits which represent memory and all CPU registers at byte granularity level;
   an interrupt handler; and
   an introspection system executable by the at least one computing device, the introspection system being configured to:
     determine that an introspection program executed by the first virtual machine is requested to introspect the second virtual machine;
     determine, by the interrupt handler, a start and end of an interrupt by using a counter that 1) is initialized to zero, 2) is incremented when a non-system call interrupt executes, and 3) is decremented when an interrupt return instruction executes, wherein 1) the start of the interrupt occurs when a first non-system call interrupt executes, 2) the end of the interrupt occurs when the counter returns to a value of zero, 3) each non-system call interrupt may have one or more nested non-system call interrupts, and 4) each non-system call interrupt is returned using a respective interrupt return instruction; and determine, using the determined start and end of the interrupt, a system call execution context of the introspection program in response to determining that the introspection program is requested to introspect the second virtual machine, the system call execution context being determined by isolating a kernel space of the introspection program from an inspection of a control register value, the control register value being acquired based at least in part on an update of the control register value in response to an execution of a system call for the introspection program;

initialize all the taint bits to zero;

use the isolated kernel space to assign a plurality of the taint bits in the shadow memory a value of one, wherein the value of one indicates the corresponding byte of memory or CPU register contains redirectable data;

identify, using the taint bits in shadow memory, redirectable data in a memory of the second virtual machine based at least in part on the system call execution context of the introspection program, the redirectable data being redirectable to a portion of the memory of the first virtual machine; and configure the introspection program to access the redirectable data.

2. The system of claim 1, wherein the at least one computing device corresponds to a single computing device.

3. The system of claim 1, further comprising a virtualization layer executable by the at least one computing device, the virtualization layer being configured to manage the first and second virtual machines.

4. The system of claim 1, wherein the first virtual machine and the second virtual machine are configured to execute identical operating system kernels.

5. The system of claim 1, wherein the introspection system is configured to configure the introspection program to access the redirectable data by dynamic binary instrumentation.

6. The system of claim 1, wherein the introspection system causes the introspection program to access the redirectable data by mapping a portion of the memory of the second virtual machine to a portion of the memory of the first virtual machine.

7. The system of claim 1, wherein the introspection system is further configured to identify the redirectable data based at least in part on interrupt context interception for the second virtual machine.

8. The system of claim 1, wherein the introspection system is further configured to identify the redirectable data based at least in part on a predetermined system call redirection policy.

9. The system of claim 1, wherein the introspection system is further configured to identify the redirectable data based at least in part on a taint analysis that tracks unredirectable data in the memory of the second virtual machine.

10. The system of claim 1, wherein the introspection system is further configured to perform a copy-on-write operation on a portion of the redirectable data in response to the introspection program performing a data write on the portion of the redirectable data.

11. A method, comprising:

determining, by a computing device, that an introspection program executed by a first virtual machine of the computing device will be used to access data in a memory of a second virtual machine of the computing device;

determining, by an interrupt handler, a start and end of an interrupt by using a counter that 1) is initialized to zero, 2) is incremented when a non-system call interrupt executes, and 3) is decremented when an interrupt return instruction executes, wherein 1) the start of the interrupt occurs when a first non-system call interrupt executes, 2) the end of the interrupt occurs when the counter returns to a value of zero, 3) each non-system call interrupt may have one or more nested non-system call interrupts, and 4) each non-system call interrupt is returned using a respective interrupt return instruction;

determining, by the computing device and based on the determined start and end of the interrupt, a system call execution context of the introspection program, the system call execution context being determined by isolating a kernel space of the introspection program from an inspection of a control register value, the control register value being acquired based at least in part on an update of the control register value in response to an execution of a system call for the introspection program;

initializing a plurality of taint bits to zero, wherein a shadow memory stores the plurality of taint bits and the plurality of taint bits represent memory and all CPU registers at byte granularity level;

using the isolated kernel space to assign the plurality of the taint bits a value of one, wherein the value of one indicates the corresponding byte of memory or CPU register contains redirectable data;

identifying, by the computing device and using the plurality of taint bits, a portion of kernel data in the memory of the second virtual machine based at least in part on the system call execution context, the portion of kernel data being redirectable to a portion of the memory of the first virtual machine; and dynamically instrumenting, by the computing device, the introspection program to perform a data operation upon the portion of kernel data in the memory of the second virtual machine.

12. The method of claim 11, wherein the first virtual machine corresponds to a trusted virtual machine, and the second virtual machine corresponds to an untrusted virtual machine.

13. The method of claim 11, wherein the identifying, by the computing device, the portion of kernel data further comprises identifying, by the computing device, the portion of kernel data based at least in part on a taint analysis distinguishing kernel stack data from other kernel data.

14. The method of claim 11, wherein the data operation comprises a data write.

15. The method of claim 11, further comprising performing, by the computing device, an offline mapping of the portion of kernel data in the memory of the second virtual machine to the memory of the first virtual machine.

16. The method of claim 11, further comprising performing, by a hypervisor of the computing device, an online mapping of the portion of kernel data in the memory of the second virtual machine to the memory of the first virtual machine.

17. The method of claim 11, wherein determining, by the computing device, the system call execution context further comprises isolating, by the computing device, a thread execution context based at least in part on a page directory pointer, a process name, and a kernel stack pointer.

18. A non-transitory computer-readable medium having a plurality of computer instructions, wherein, when executed by a computing device, the plurality of computer instructions cause the computing device to perform operations comprising:

determining that an introspection program executed by a first virtual machine of the computing device will be used to access data in a memory of a second virtual machine of the computing device;

determining, by an interrupt handler, a start and end of an interrupt by using a counter that 1) is initialized to zero, 2) is incremented when a non-system call interrupt executes, and 3) is decremented when an interrupt return instruction executes, wherein 1) the start of the interrupt occurs when a first non-system call interrupt executes, 2) the end of the interrupt occurs when the counter returns to a value of zero, 3) each non-system call interrupt may have one or more nested non-system call interrupts, and 4) each non-system call interrupt is returned using a respective interrupt return instruction;

determining, based on the determined start and end of the interrupt, a system call execution context of the introspection program, the system call execution context being determined by isolating a kernel space of the introspection program from an inspection of a control register value, the control register value being acquired based at least in part on an update of the control register value in response to an execution of a system call for the introspection program;

initializing a plurality of taint bits to zero, wherein a shadow memory stores the plurality of taint bits and the plurality of taint bits represent memory and all CPU registers at byte granularity level;

using the isolated kernel space to assign the plurality of the taint bits a value of one, wherein the value of one indicates the corresponding byte of memory or CPU register contains redirectable data;

identifying, using the plurality of taint bits, a portion of kernel data in the memory of the second virtual machine based at least in part on the system call execution context, the portion of kernel data being redirectable to a portion of the memory of the first virtual machine; and dynamically instrumenting, by the computing device, the introspection program to perform a data operation upon the portion of kernel data in the memory of the second virtual machine.

19. The non-transitory computer-readable medium of claim 18, wherein the data operation comprises a read operation and a write operation.

20. The non-transitory computer-readable medium of claim 18, wherein the first virtual machine corresponds to a trusted virtual machine, and the second virtual machine corresponds to an untrusted virtual machine.

* * * * *